Oct. 12, 1937.   A. J. DIESCHER   2,095,243
APPARATUS FOR TRANSPORTING GAS
Filed Nov. 23, 1933   13 Sheets-Sheet 3
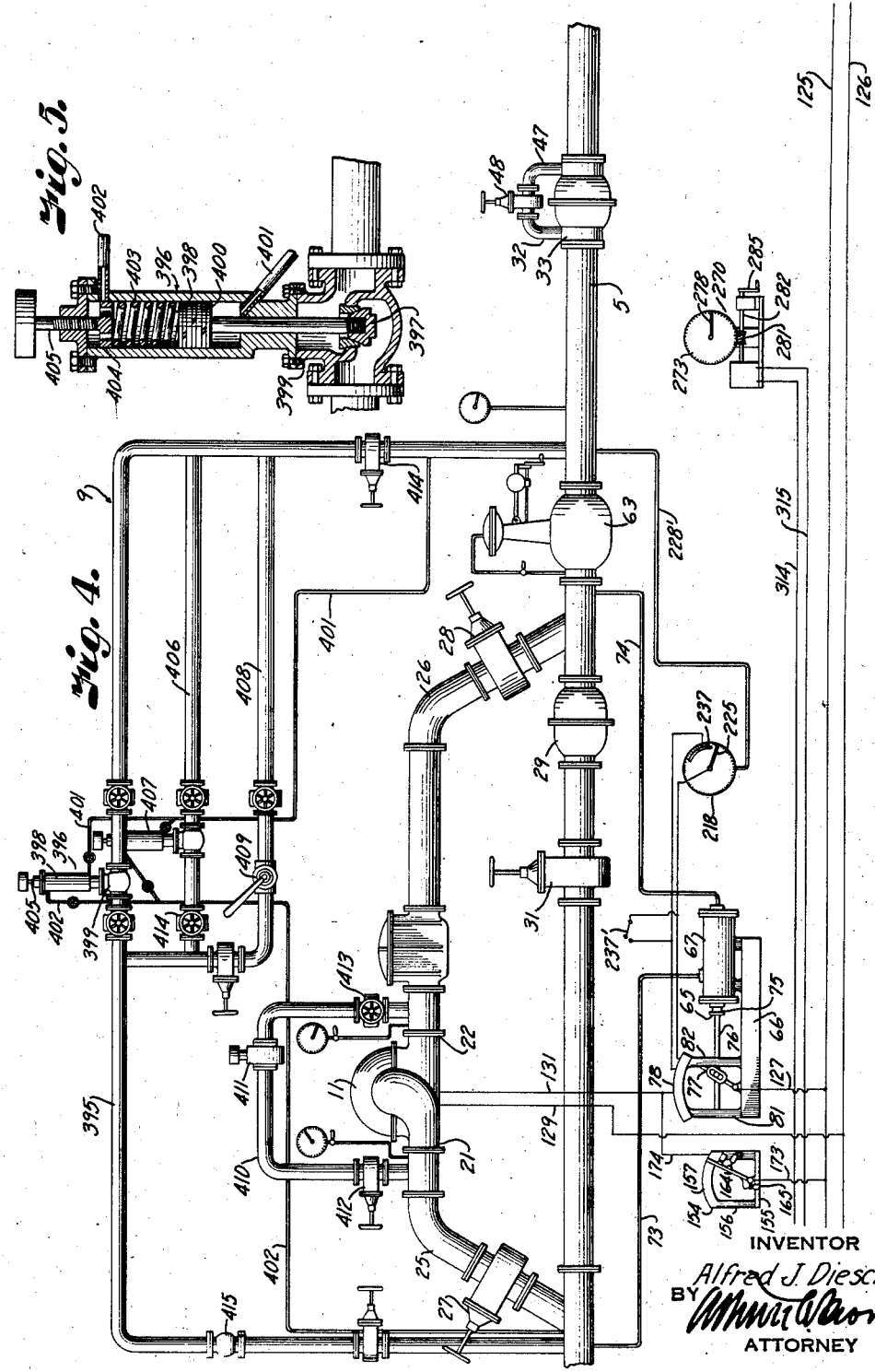
INVENTOR
Alfred J. Diescher.
BY
ATTORNEY

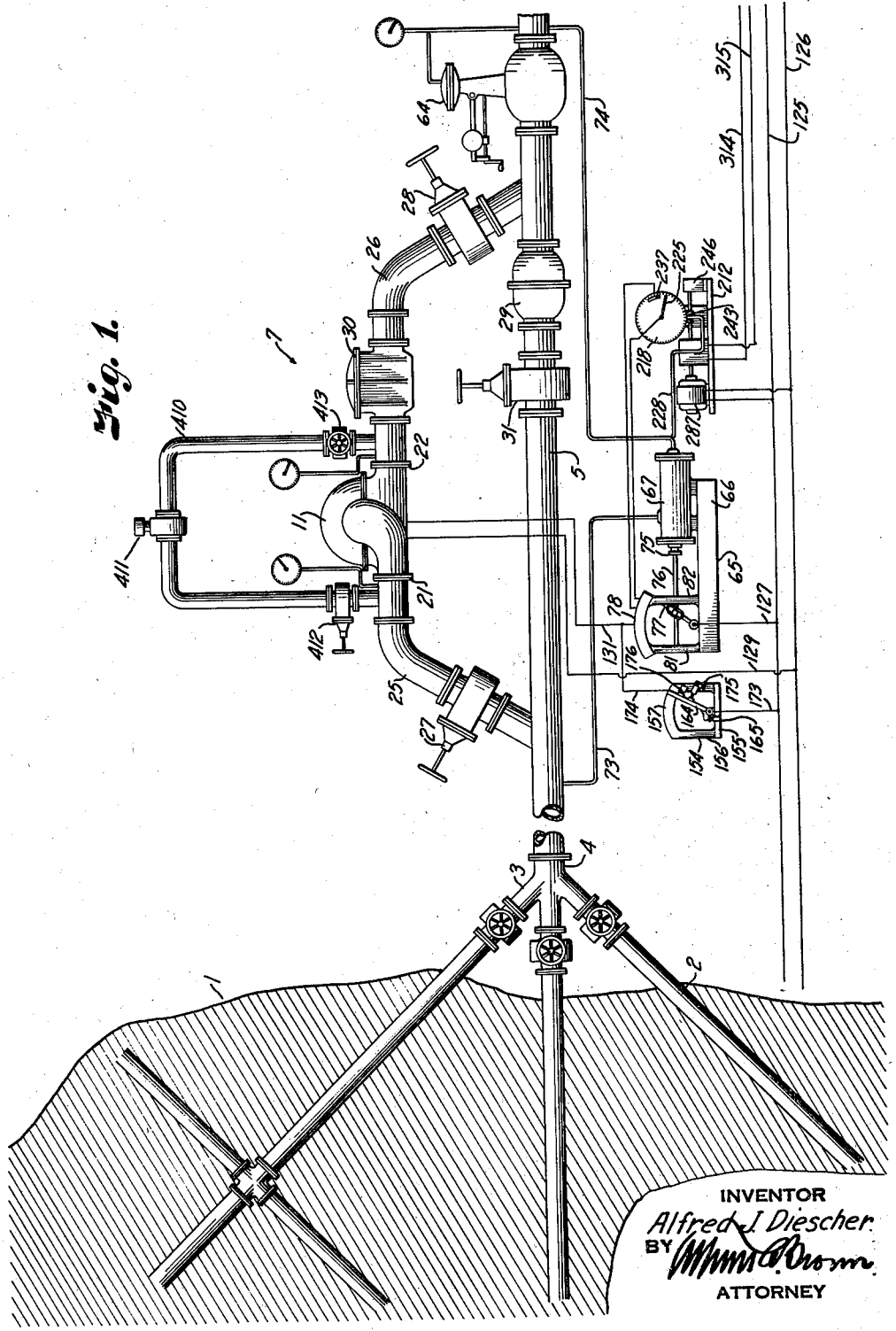

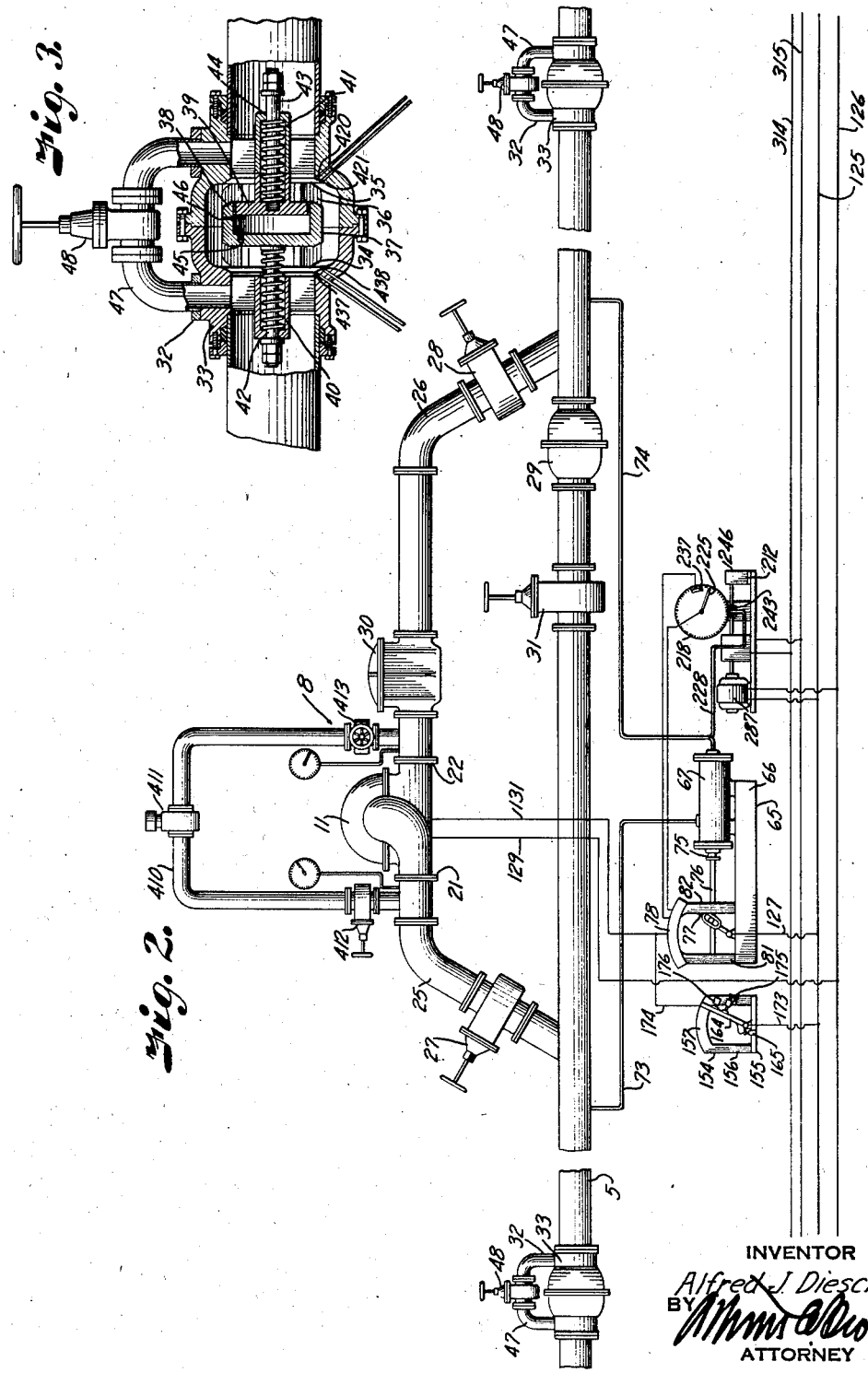

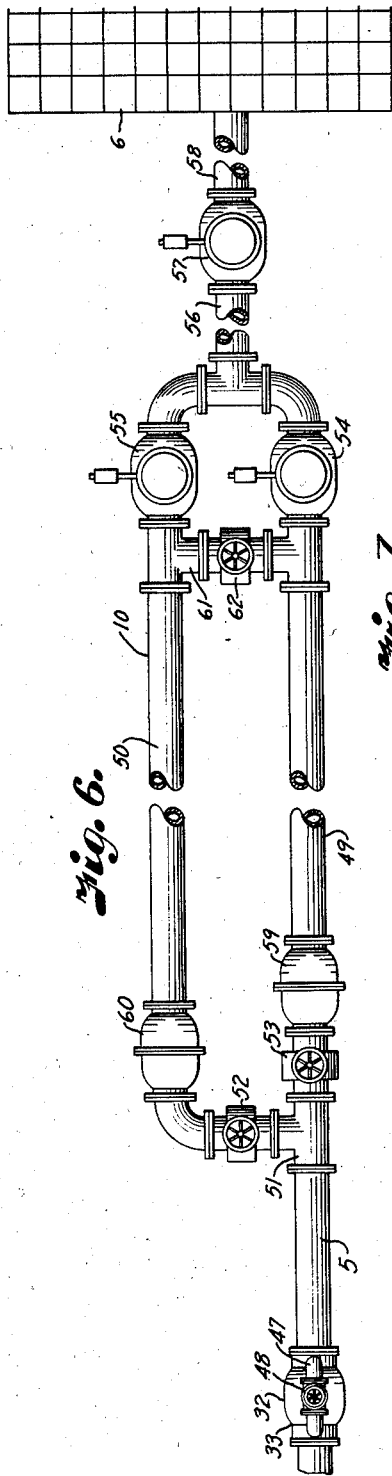

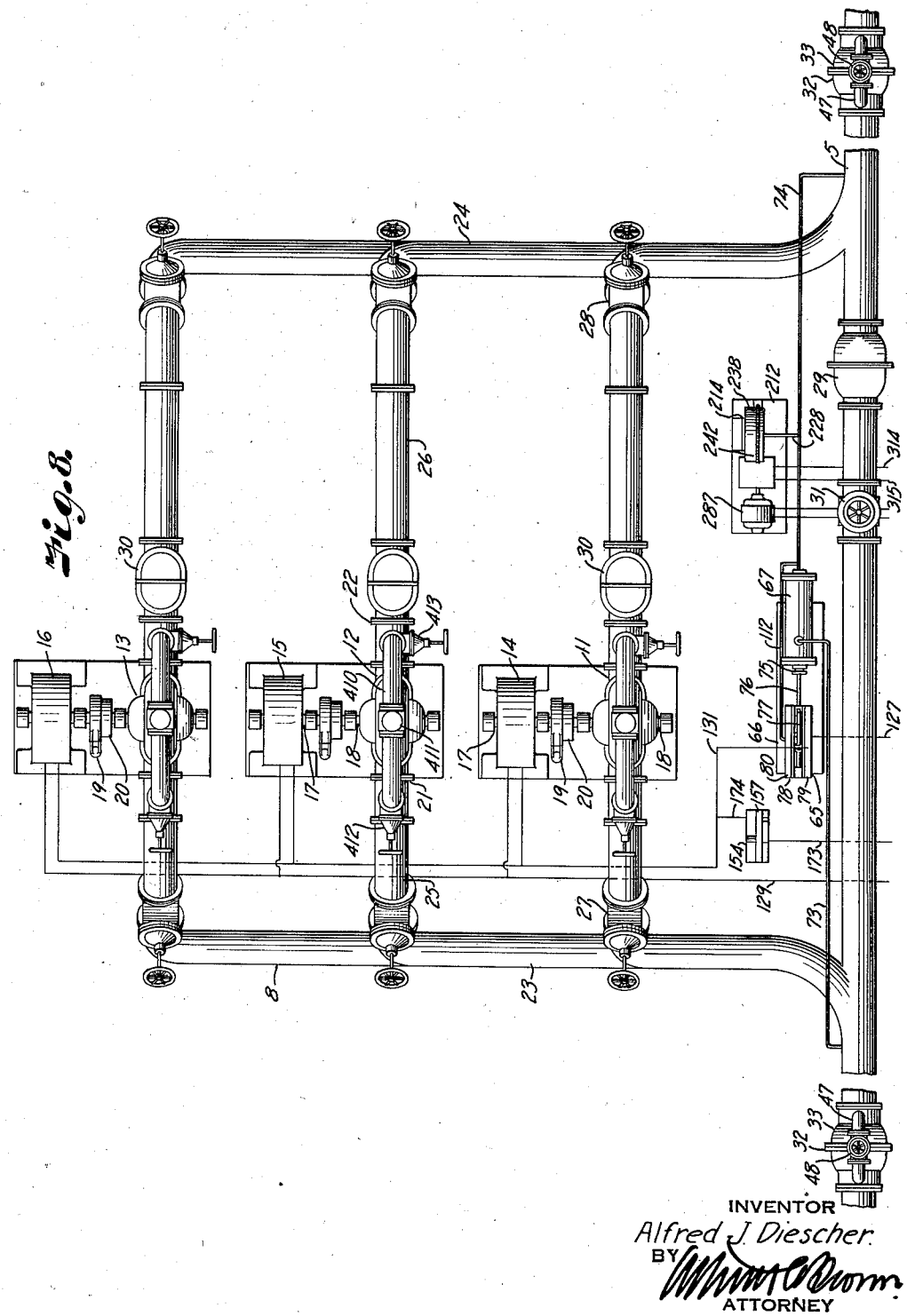

Oct. 12, 1937.　　　A. J. DIESCHER　　　2,095,243
APPARATUS FOR TRANSPORTING GAS
Filed Nov. 23, 1933　　　13 Sheets-Sheet 6
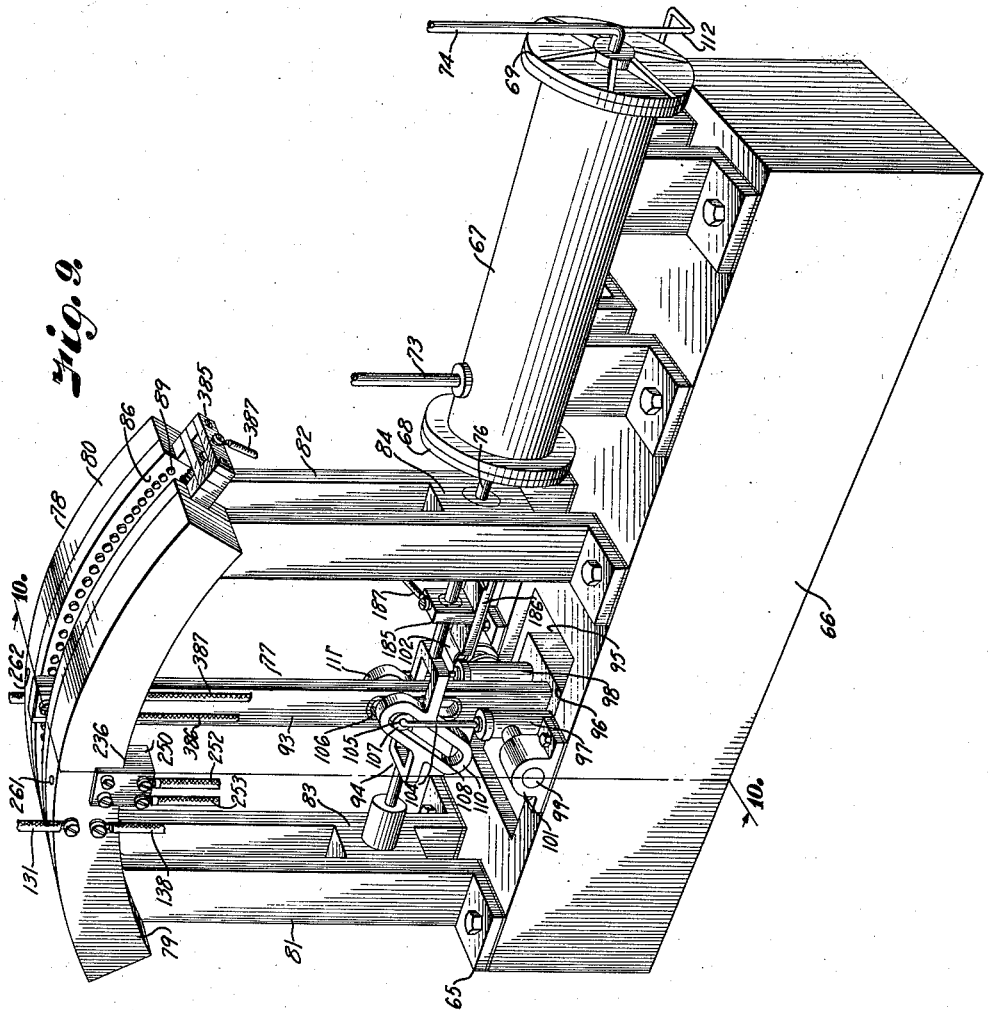
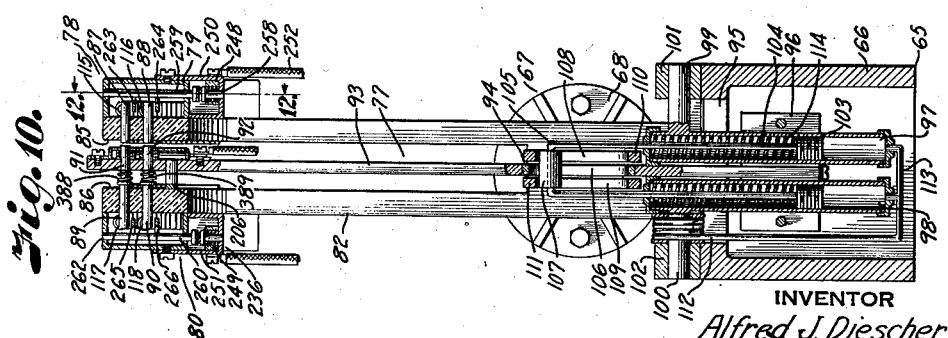
INVENTOR
Alfred J. Diescher
BY
ATTORNEY

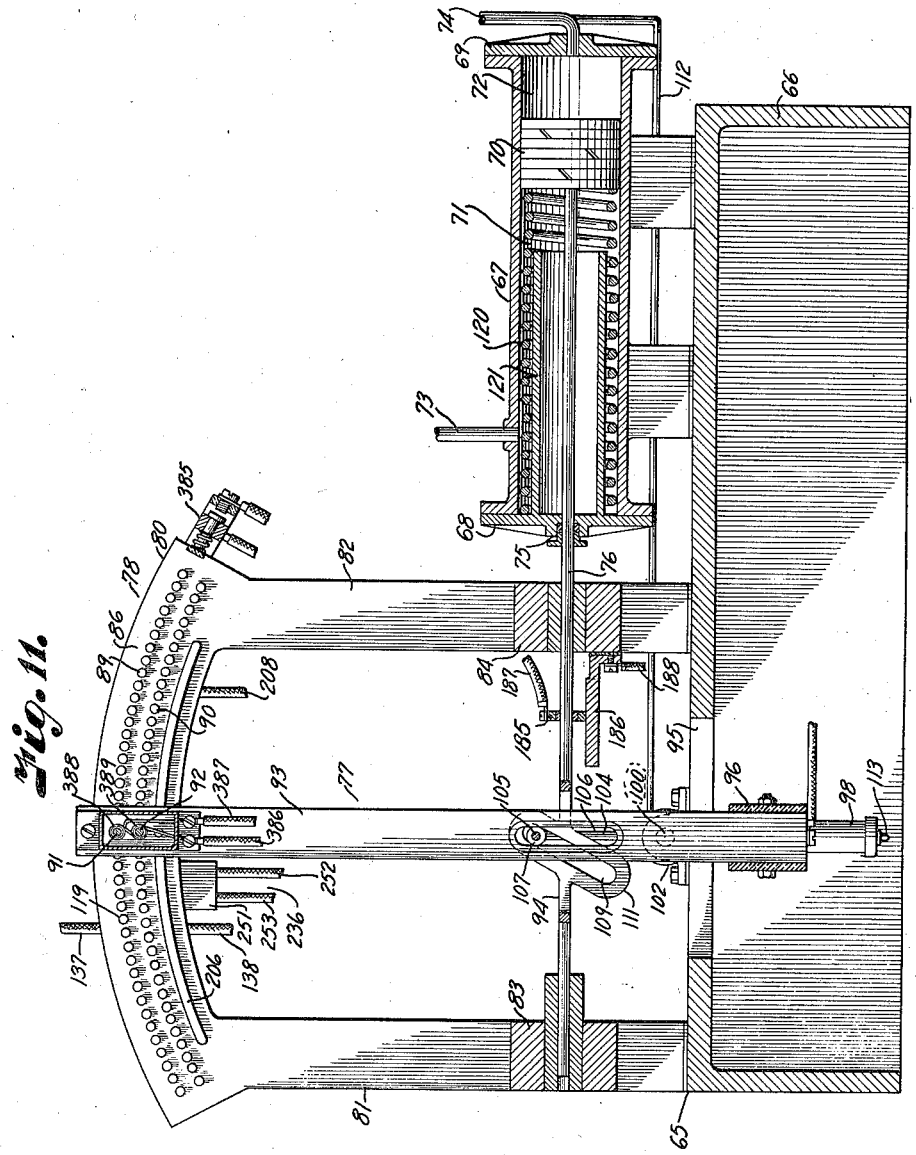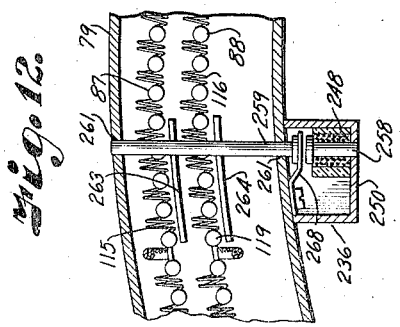

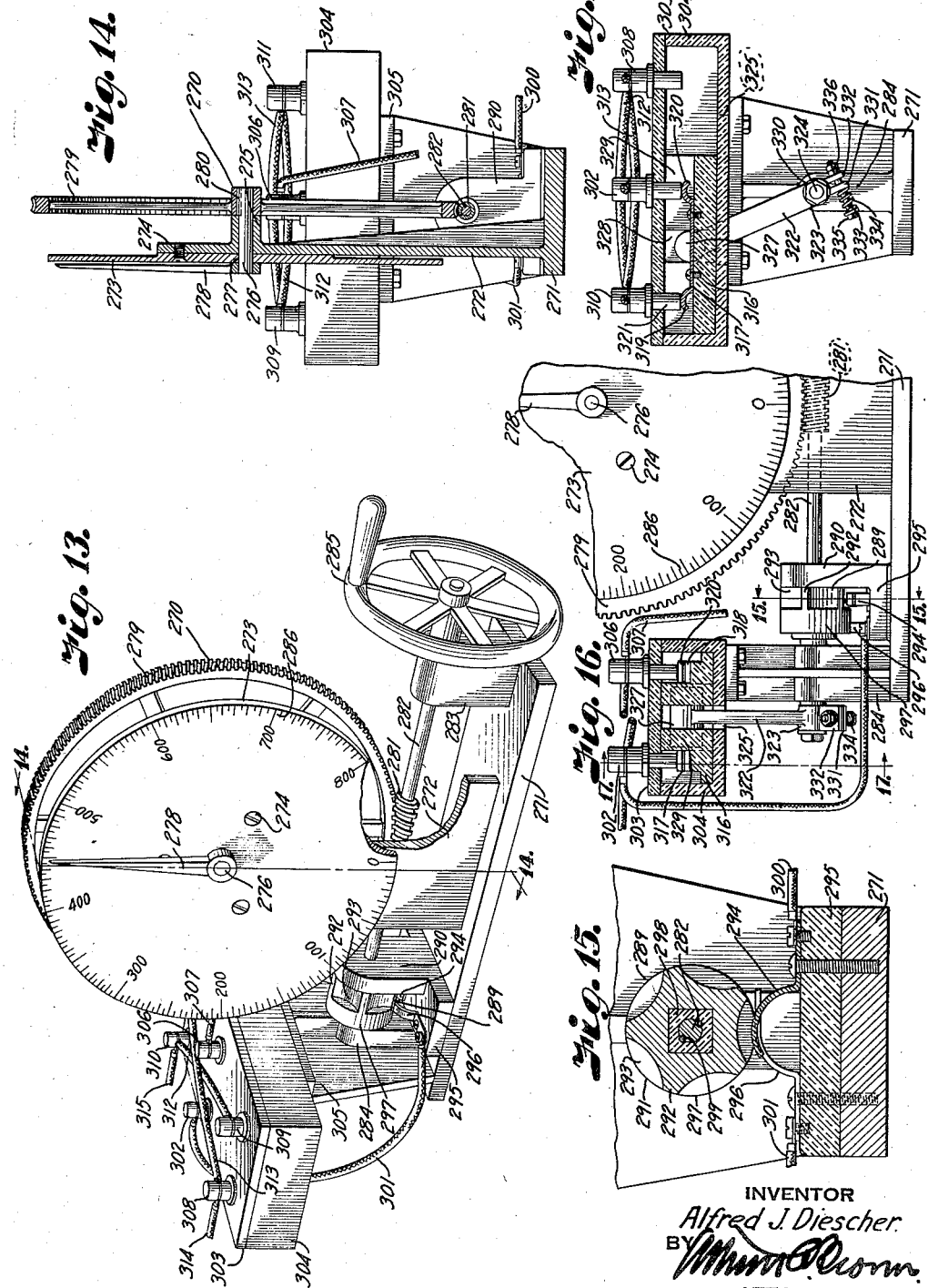

Oct. 12, 1937.  A. J. DIESCHER  2,095,243
APPARATUS FOR TRANSPORTING GAS
Filed Nov. 23, 1933   13 Sheets-Sheet 9
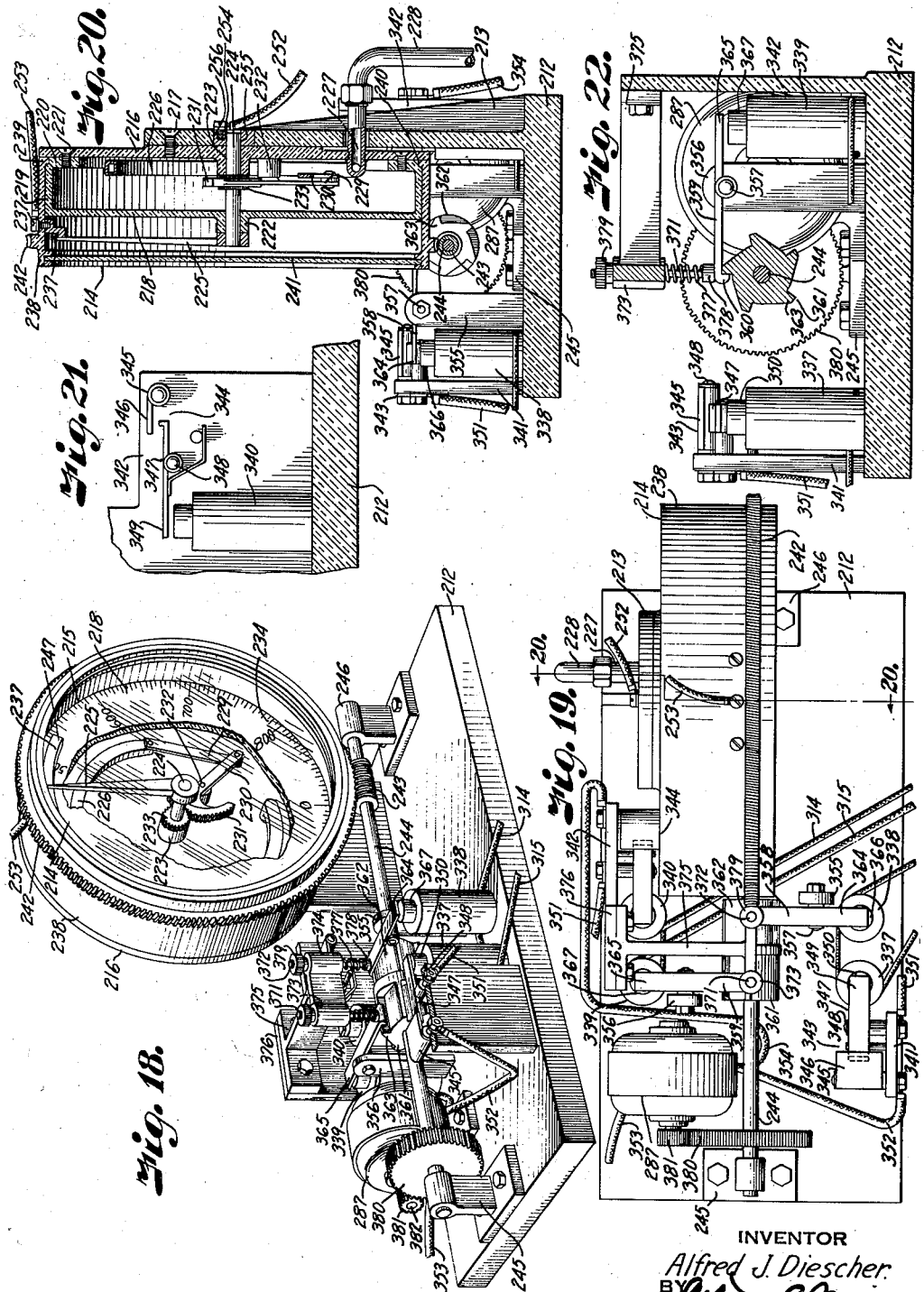
INVENTOR
Alfred J. Diescher
BY
ATTORNEY

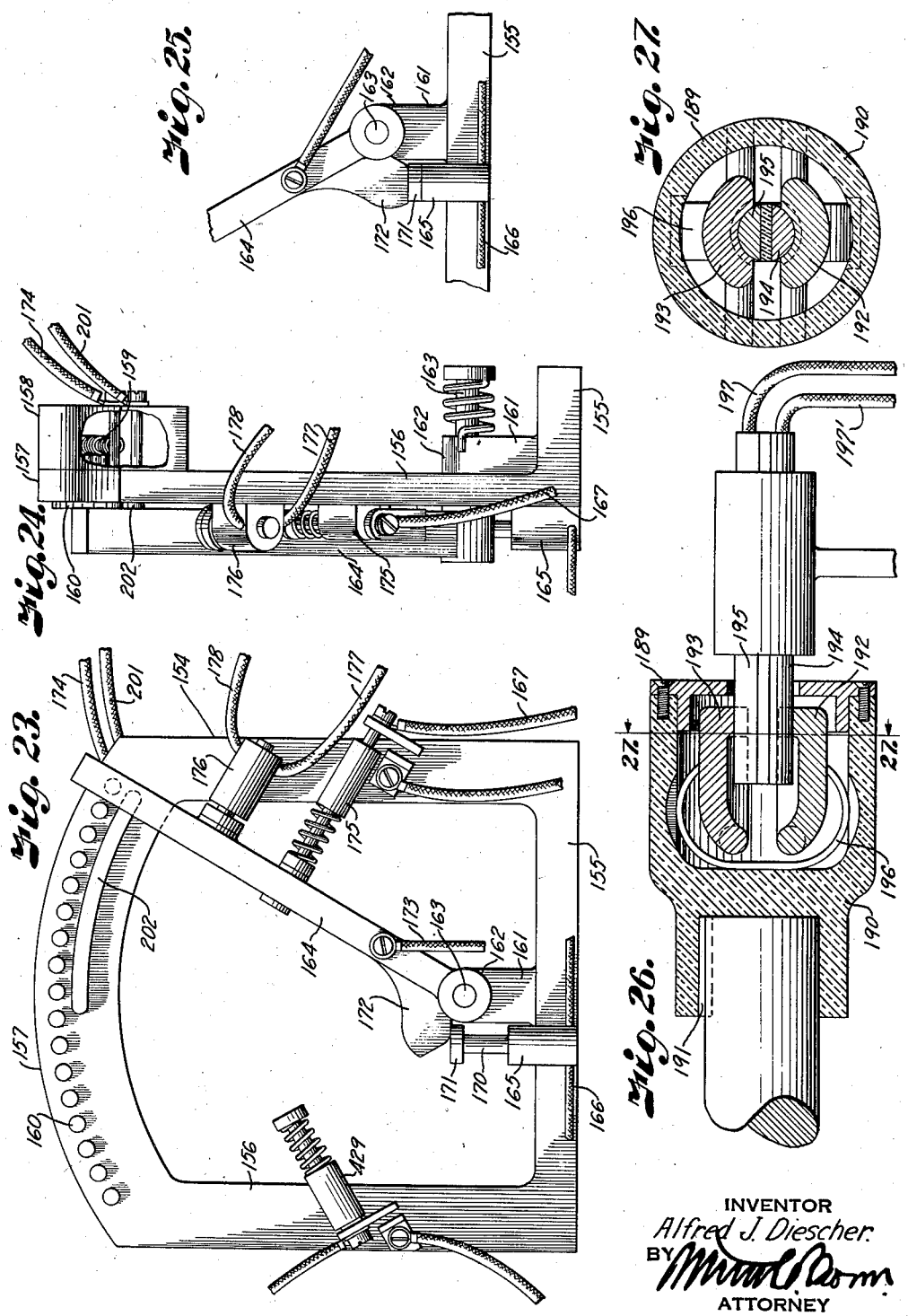

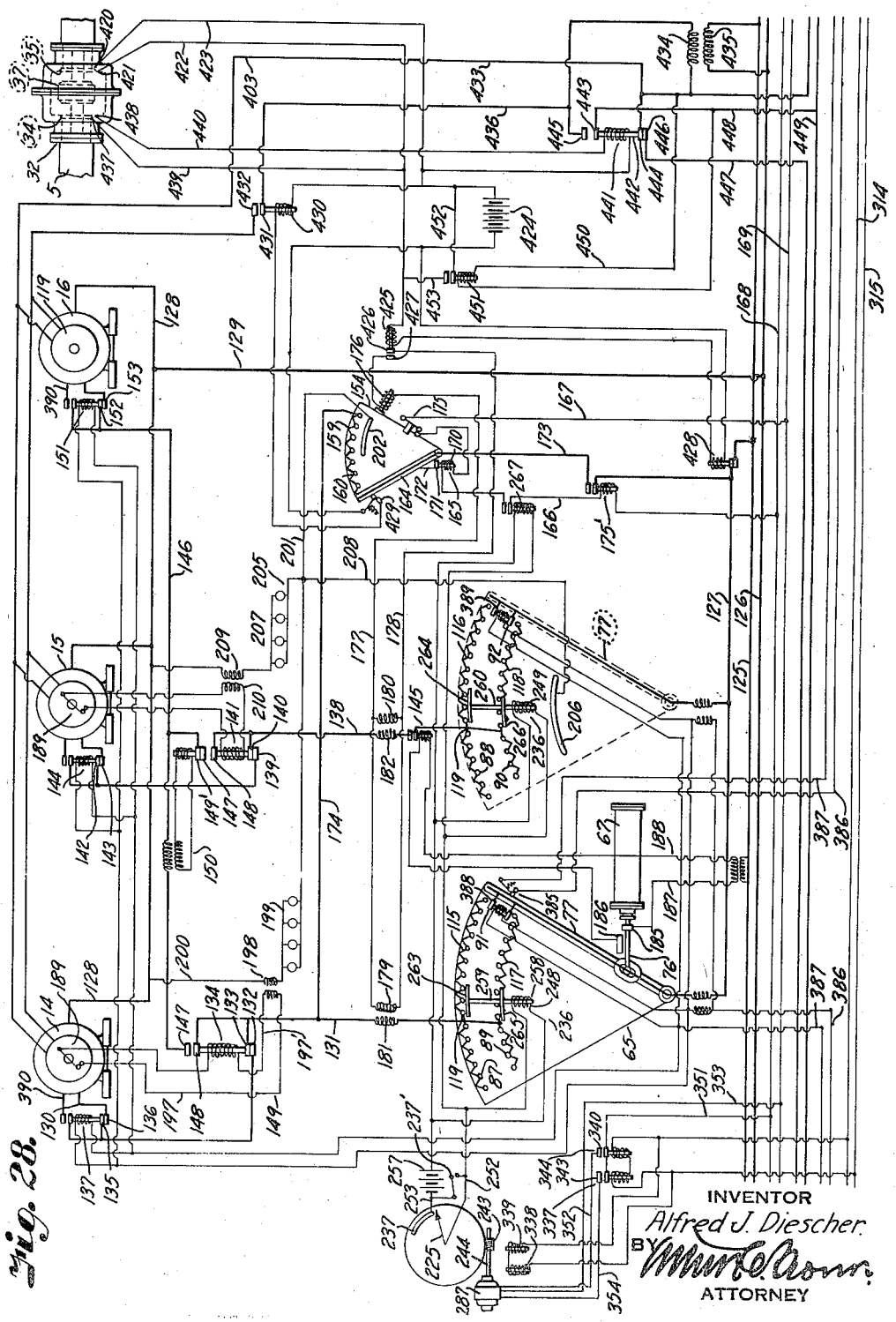

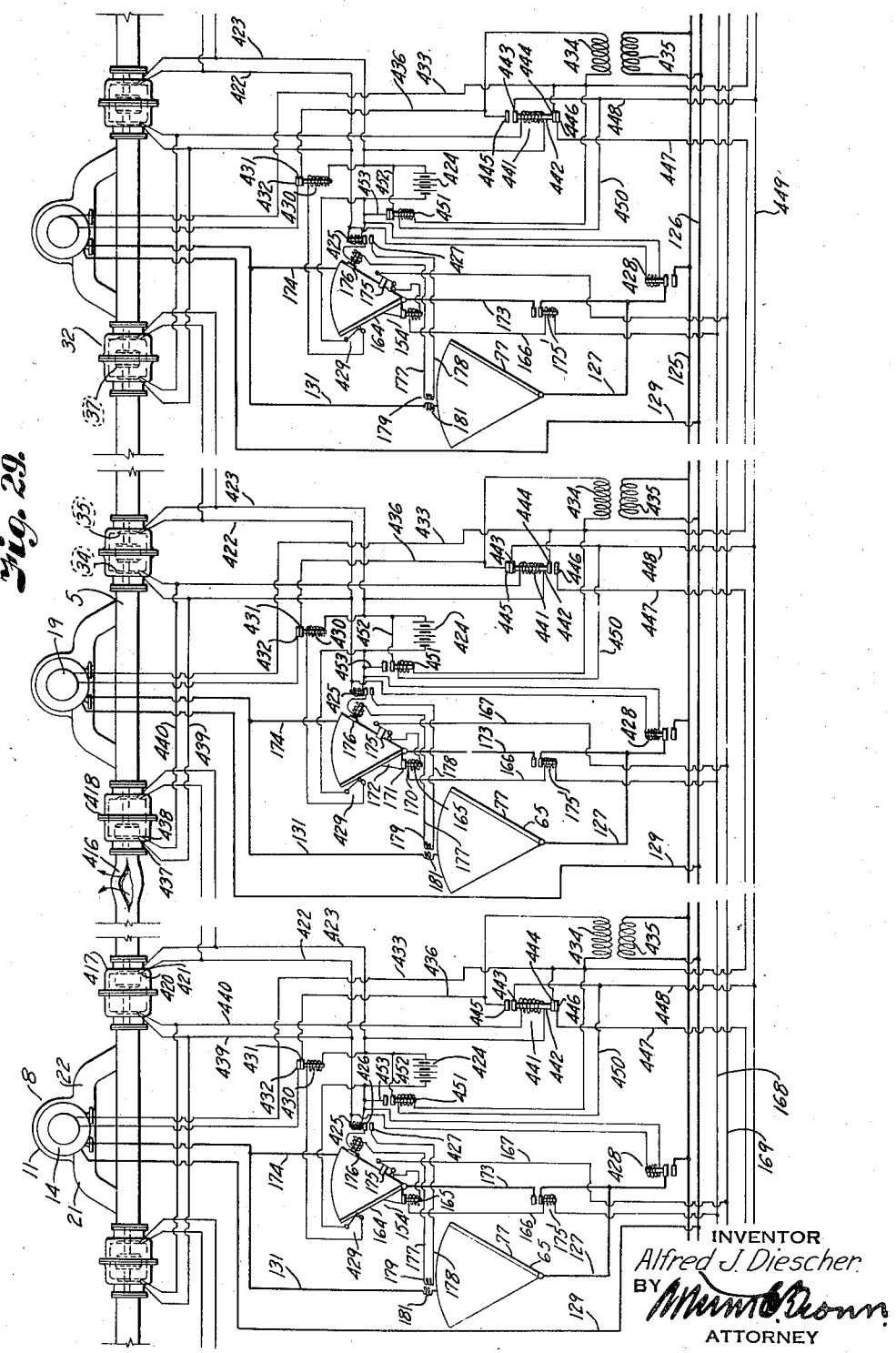

Oct. 12, 1937.  A. J. DIESCHER  2,095,243
APPARATUS FOR TRANSPORTING GAS
Filed Nov. 23, 1933  13 Sheets—Sheet 13

INVENTOR
Alfred J. Diescher
BY
Arthur C. Brown
ATTORNEY

Patented Oct. 12, 1937

2,095,243

UNITED STATES PATENT OFFICE 2,095,243

APPARATUS FOR TRANSPORTING GAS

Alfred J. Diescher, Winfield, Kans., assignor of one-half to M. L. R. Diescher, Winfield, Kans.

Application November 23, 1933, Serial No. 699,393

32 Claims. (Cl. 48—191)

This invention relates to a method of and apparatus for transporting an elastic fluid such as gas to a market or delivery point from a distant source of supply.

In recent years it has become necessary to transport gas from more distant sources of supply, necessitating higher operating costs and higher market prices which have in turn restricted the scope of the market and the earning capacity of the transportation system. It has also been difficult to render efficient and satisfactory service to meet widely varying market conditions because the transport capacity of a line is limited and during times of excessive market demands gas is drawn from the line faster than it can be transported. Gas is a material substance, and it requires time to transport a new volume from the field. In most instances gas cannot be made to travel faster through the line than it requires a passenger train to traverse the same distance. Consequently, when blizzards occur and the demand is excessive, the service becomes demoralized with all the dissatisfaction, discomfort and economic and political consequences which follow under such conditions.

It is, therefore, the principal object of the present invention to provide an increased transport capacity at a lower cost of installation and operation, as well as providing a more efficient and satisfactory service in meeting the varying demands of a widely fluctuating market.

It is also an object of the invention to adequately sustain a wider market whereby the cost ratio of the gas transported may be reduced to the consumer.

In accomplishing these and other objects of the invention, I have provided improved details of structure and method of transportation, as illustrated in the accompanying drawings, wherein:

Fig. 1 is a diagrammatic view of the field compressor station and the gathering lines from the various gas wells supplying the transportation line.

Fig. 2 is an elevational view of one of the intermediate or booster stations for maintaining pressure in the line required to move a given volume of gas.

Fig. 3 is a detail sectional view through one of the double acting check valves in the main transportation line.

Fig. 4 is an elevational view of the pressure regulating or main control station which is located adjacent the market end of the line.

Fig. 5 is a detail sectional view through one of the bleeder valves at the main control station.

Fig. 6 illustrates the market leg of the line.

Fig. 7 is a pressure diagram of the system.

Fig. 8 is a plan view illustrating the compressor arrangement of the relay or booster stations, as laid out for three compressor units.

Fig. 9 is a detail perspective view of one of the compressor motor speed control regulators.

Fig. 10 is a vertical sectional view through the speed control regulator on the line 10—10, Fig. 9.

Fig. 11 is a longitudinal vertical sectional view through the speed control regulator.

Fig. 12 is a detail sectional view on the line 12—12, Fig. 10.

Fig. 13 is a detail perspective view of the manual control for setting a predetermined discharge pressure at each of the compressor stations.

Fig. 14 is a vertical cross sectional view through the manual control on the line 14—14, Fig. 13.

Fig. 15 is a detail section through the contact switch for sending electric impulses to control the motors which operate the discharge pressure stabilizers at the respective compressor stations, taken on the line 15—15, Fig. 16.

Fig. 16 is a detail sectional view through the reversing switch for reversing flow of current through the lines connecting the control apparatus with the stabilizers.

Fig. 17 is a sectional view through the current reversing switch on the line 17—17, Fig. 16.

Fig. 18 is a perspective view of one of the station discharge pressure stabilizers.

Fig. 19 is a plan view of the stabilizer.

Fig. 20 is a vertical sectional view through the stabilizer on the line 20—20, Fig. 19.

Fig. 21 is a detail view of the magnet switch for energizing the stabilizer operating motor circuit.

Fig. 22 is a sectional view through the latch mechanism for releasing and stopping operation of the stabilizer motor.

Fig. 23 is an elevational view of the switch rheostat for initially starting the compressor motors.

Fig. 24 is a side view of the switch rheostat.

Fig. 25 is a detail view of the magnet for actuating the switch rheostat.

Fig. 26 is a sectional view through the governor switch on the compressor motor shafts.

Fig. 27 is a cross section through the governor switch on the line 27—27, Fig. 26.

Fig. 28 is a wiring diagram of the electrical system controlling operation of the compressor stations.

Fig. 29 is a diagram illustrating the operation of stations on opposite sides of a line break.

Figure 30:
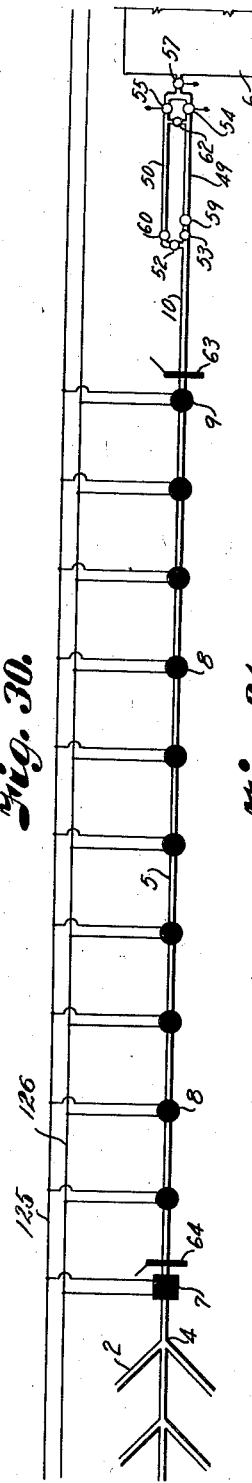
Fig. 30 is a diagrammatic view of a power lay-out for supplying current to the respective compressor stations.

Referring more in detail to the drawings:

1 designates a gas field and 2 gathering lines (Fig. 1) which collect gas from the wells and convey it usually under well pressure to the valved manifold connections 3 communicating with the inlet end 4 of a main gas transportation line 5 which leads to a distant market indicated at 6 in Fig. 6, or to side markets along the route of the line 5, through suitable branch lines, as later described.

Located adjacent the field and connected with the main line is a field compressor station 7 for raising the field pressure of the gas to a predetermined discharge pressure for starting initial flow of a predetermined volume of gas into the line.

Flow of gas is promoted through the line by alternately compressing and expanding the gas through the medium of a compressor or relay station or stations 8 (Fig. 2) located at spaced intervals along the line between the field station and a control station 9 (Fig. 4) supplying the market leg 10 (Fig. 6) of the line. That is, gas drawn into the intake of one compressor station at a predetermined pressure $P_2$ is discharged at a given pressure $P_1$ to be expanded to the intake pressure $P_2$ of the next succeeding compressor station and so on down the line toward the market. Flow of gas through the line, therefore, depends mainly upon the difference in pressure between $P_1$ and $P_2$, the greater the difference, the faster the flow, but speed of flow is limited by compressor displacement and motive power available.

Pressure of gas at the field is relatively constant over a given period of time, but the terminal pressure at the market end of the line varies widely dependent upon varying market demands caused by sudden weather changes, or even the different cooking periods of the day.

During the night, or off-peak periods, pressures at the market terminals are built up to increase the volume of gas stored in the line to prepare for the greater demand periods of the day so that under ordinary conditions fluctuations of the terminal pressures do not materially affect total daily volume movement of gas through the line.

However, in case of sudden fluctuations in the market demand with the compressors running steadily, the line flow is seriously affected because of the limitation on line pressure and because the horse power of the prime movers for the compressor stations varies under wide line pressure fluctuations.

In times of peak demands, as for example, when a blizzard occurs at the market, the terminal pressure is pulled down very rapidly, draining the market leg of the line and the next following station legs in varying degrees, increasing the flow capacity of the line and causing a sudden flow of gas carried in the line to supply the market, but this flow is of short duration and acts to disrupt operation of the line since it changes the $P_1$ and $P_2$ pressure ratio. Changing the $P_1$ and $P_2$ ratio disturbs operation of the compressor motive power in its attempt to maintain the discharge pressure and results in pulling down the intake pressures so that the compressors cannot take in as much gas at the lower pressure as before. The result is that the stations fight each other in the attempt to send gas ahead and the harder they pull on the available supply on the intake side, the lower the intake falls and the lower the volume of gas moved so that the net result is lower line capacity on prolonged peak demand.

On long lines where it takes several days to carry new additional gas from the field to market, the effect of sudden demands on the market is that each succeeding compressor station tends to rob the preceding station of its storage gas (that amount of gas carried in the line incidental to pressure drop less than that necessary to effect maximum line flow), continually reducing its intake pressure until the system pressures balance to that of volume which the compressors can forward pending new additional gas from the field to rebuild intake pressure which, as above stated, cannot be delivered to the market fast enough to supply the homes, hospitals, etc., which are dependent upon gas, thus threatening disrupted service.

In order to guard against such distress in times of peak demand, I contemplate maintaining a maximum transport capacity of the line and stations and eliminate wide pressure fluctuations in the controlled portions of the pipe line. I accomplish this by operating the system constantly at substantially the maximum pressure for which it was designed (or in milder seasons, at a predetermined maximum pressure), thereby maintaining a basis for maximum line flow and storage at all times during the periods of the year when the peak demands are likely to occur.

In carrying out my system I contemplate operating the compressors on narrow compression ratio and locate the stations closer together in order to obtain the required line flow. Such a station arrangement holds the line pressures more constant and keeps the pressure drop narrower between stations.

Such installation also effects greater saving in power installation and operating cost as the power required to compress gas or to raise the pressure reduces rapidly as compression ratios decline. For example, to transport 210,000,000 cubic feet of 4 oz. gas daily 100 miles through 24" pipe with 600 lbs. absolute maximum line pressure will require a pressure drop in that distance of 400 lbs., making the $P_2$ pressure 200 lbs. absolute or a compression ratio of 3 to 1. This compression ratio requires 67 indicated horse power in the compression cylinder to recompress the gas from 200 lbs. to 600 lbs. per each million cubic feet per day to carry it the same distance in the next station leg of the line.

To carry the same amount of gas 10 miles will require a pressure drop of only 27.8 lbs., making the $P_2$ pressure 572.2 lbs. at 10 mile terminal which equals a 1 to 1.048 compression ratio. To compress this gas to 600 lbs. to carry it the same distance on the next 10 mile leg will require only 2.1 indicated horse power in the compressor cylinder and ten such legs or 100 miles would require only 21 indicated horse power as against the 67 horse power required in the 3 compression ratio.

For the line and pressure conditions I use in the drawings and diagram, I adopt a 10 mile spacing of the booster or relay stations, a 110 mile market leg, and assume a $P_1$ pressure of 615 lbs. absolute and the $P_2$ pressure of 587 lbs. absolute or 600 and 572 lbs. gauge pressures respectively or a differential pressure of 28 lbs. between stations. The pipe line is 23" inside diameter and has a capacity of 216,000,000 cubic feet of 8 oz. gas per day with $P_1$ of the distributing system at the market of 80 lbs. gauge or 95 lbs. absolute.

While I have set forth the above figures, they are simply for the purpose of setting forth actual conditions of a pipe line operating in accordance with my invention, and I do not wish to be limited to the above figures as it is obvious that they may be varied to suit the requirements of any individual transportation system.

In the system illustrated each station includes three compressor units 11, 12 and 13 respectively, which may be of any type but are here shown as of the rotary type, individually driven preferably by two speed, double rated induction motors having high and low speeds for the reason later described.

The motors 14, 15 and 16 have their armature shafts 17 directly connected to the propeller shafts 18 of the respective compressors through a clutch and brake mechanism 19 and 20. The intake and discharge connections 21 and 22 of each compressor are connected with intake and discharge manifolds 23 and 24 through branch conduits 25 and 26 respectively, the branches being provided with gate valves 27 and 28 by which flow of gas may be diverted from either one or all of the compressors. The manifolds 23 and 24 are connected directly to the main flow line 5 on the opposite sides of a check valve 29 which closes direct flow through the line when the $P_1$ pressure exceeds the $P_2$ pressure to divert the gas through the compressors that are in service.

The discharge connection for each compressor is equipped with a check valve 30 to prevent back flow through the compressors when they are not operating.

The flow line may also be provided with a gate valve 31 for manually interrupting flow through the main line between the manifold connections. The main flow line may also be equipped with double acting check valves 32 at opposite sides of the station and at suitable intervals along the line to retain gas in the line in case of a line break.

One of the double acting check valves is illustrated in detail in Fig. 3 and includes a valve casing 33 having opposed valve seats 34 and 35 at the opposite ends thereof in axial alignment with the axis of the line connection with the casing.

Slidably mounted in the casing on guide ribs 36 is a double faced check member 37 adapted to engage either of the seats upon differential in pressure at opposite ends of the housing. The check member is preferably provided with a cylindrical piston chamber 38 opening from the discharge side of the valve to accommodate a piston 39 which aids in unseating the check member, as later described. The piston and check member are normally retained in neutral position between the seats by coiled springs 40 and 41 sleeved on rods 42 and 43 projecting from the inlet side of the check member and the discharge side of the piston respectively, the rods being guided in bearings 44 supported in the valve housing. The piston and check member form a chamber which is filled with high pressure gas when the valve seats to aid the springs in unseating the check member. The gas is admitted to the chamber through a poppet valve 45 in the wall of the check member and is released through a port 46 when the check is open.

The operation of the check is as follows:

Assuming that there is a line break on the discharge side of the valve caused by a broken line, the pressure on the inlet side of the check member and the sudden flow through the casing will cause it to engage the seat 35 and close off flow of gas into the broken section of the pipe. When the valve has closed, high pressure gas is trapped in the piston chamber since the piston is supported against movement in the direction of the discharge side by its engagement with the adjacent bearing 44.

After the line break has been repaired, gas is initially admitted to the broken section through a valved by-pass 47 communicating with the opposite ends of the valve housing so that when its valve 48 is opened the pressures tend to equalize on opposite sides of the check member. As the pressure approaches equalization, the pressure of gas trapped in the check cylinder, aided by the spring 41, will effect unseating of the check to establish normal flow through the line. After the check has opened, the valve 48 is closed to stop flow through the by-pass. The check member functions in substantially the same manner when a break occurs on the inlet side of the valve except that both the piston and check member shift their position to effect closing on the inlet seat until the broken line is repaired and the pressure rebuilt therein to lift the check member off the seat.

The double acting check valve just described is covered in a co-pending application Serial No. 598,424, now Patent No. 1,956,010 issued April 24, 1934 but is described in detail as its operation forms an important function in the present invention, as later described.

The market leg of the line (Fig. 6) includes two or more parallel trunk lines 49 and 50, the line 49 being a continuation of the main line while the line 50 is connected to the main line at its inlet end by a T connection 51 equipped with a shut-off valve 52. The line 49 is also provided with a shut-off valve 53, so that either line may be utilized as a flow line by actuating the valves in case the other line is to be repaired.

The discharge ends of the lines 49 and 50 are equipped with pressure regulators 54 and 55 respectively to retain the gas pressure therein at a predetermined value, as later described. The regulator valves are connected to a common discharge line 56 having a pressure regulator 57 for reducing the pressure to that required at the town border. The line 50 is particularly arranged to be used as a storage line and the pressure regulator 55 is set to release the gas at a lower pressure than the regulator 54. However, both of the regulators 54 and 55 are set to operate at a higher pressure than the regulator 57 which releases gas into the line 58 supplying the market 6. In order to trap the gas in the lines 49 and 50 they are equipped adjacent their inlet ends with check valves 59 and 60 respectively. When both lines are to be used as flow lines, the pressures therein may be equalized through a cross-over line 61 connecting their discharge ends ahead of the pressure regulating valves. However, under ordinary operation, flow through the cross-over line is shut off by a valve 62.

To operate a pipe line system on the low compression ratio as thus far described entails various operating problems which I have solved in my invention. For example, for economy of operation the normal power of the motors which operate the compressors is substantially that necessary for raising the $P_2$ pressure 28 pounds and consequently the differential pressure across compressor must not vary outside of the limit of power of the compressor motors as they will be unable to pull the extra load should the $P_1$ and $P_2$ pressures fluctuate beyond certain values. Consequently the range of operating control of the line is limited and the margin of storage gas in the line which can be drawn upon to meet the market demand fluctuations is also limited.

Therefore, in rendering efficient service the $P_1$ and $P_2$ pressures must remain substantially constant in spite of fluctuating market demands so that the line is held full of gas at all times to the maximum predetermined compressor discharge pressure for which the line was built or to a predetermined maximum compressor discharge pressure considered ample for efficient service, governed by the seasons of the year and the nature of the market being supplied. However, it must be understood that even though the $P_1$ pressure is varied according to seasonal conditions, the $P_2$ pressure must be likewise varied to maintain the working load of the compressors within the power range of their motors.

In establishing a constant predetermined pressure through the pipe line, I provide a back pressure regulating apparatus or valve 63 (Fig. 4) at or near the market end of the line at a point beyond the last compressor station. In the present instance the back pressure regulator is placed in the main line between the control station and the market leg of the line to prevent pressure drops in the line beyond the compression ratio for which the line is designed and to establish the maximum $P_1$ pressures on which the line is to operate. This regulator may be compared to a dam as it keeps the line full of gas at all times up to the predetermined maximum pressure and maintains the narrow pressure ratio drop which in the system illustrated is 28 lbs. at 615 lbs. $P_1$ pressure. The initial station is also provided with a similar regulator 64 (Fig. 1) to prevent gas from being delivered to the line at a pressure above that to be maintained at the discharge sides of the respective stations.

I also provide for automatically operating all of the stations so that they all act together in effecting uniform movement of the column of gas carried in the line.

This is accomplished by automatically increasing or decreasing the speed of the compressors at the respective stations responsive to the pressure ratio of $P_1$ and $P_2$ so that all of the stations move the gas at the same speed and maintain the predetermined maximum pressure throughout the length of the line ahead of said "dam".

To control speed of the compressors the prime mover for each compressor may have its speed regulated by a controller actuated by pressure differential at the intake and discharge of the respective compressors. However, in the form of the invention illustrated, each compressor station is shown as equipped with a single pressure controlled regulator 65 arranged to control speed of the compressor motors through individual resistance elements connected in circuit, supplying current to the respective motors. In this instance the regulator is operated by differential in pressure at opposite sides of the stations and is so set as to increase or decrease the speed of the compressors as the $P_2$ and $P_1$ pressure ratios vary from the predetermined set amount whereby the entire system or a selected section is primarily regulated or controlled at the regulating device 63 at the market end of the line.

Speed control regulators are best illustrated in Figs. 9 to 12 and include a base 66 for supporting a pressure cylinder 67 having end heads 68 and 69 which cooperate with a piston 70 to form closed chambers 71 and 72 at the opposite ends thereof, as best illustrated in Fig. 11. The chambers 71 and 72 are arranged to carry the $P_2$ and $P_1$ pressures of the respective station at which each speed regulator is located so that the piston is moved in the cylinder in response to differential variation of the pressures $P_1$ and $P_2$, the chamber 71 being connected to the inlet side of the station by a pipe 73 and the chamber 72 to the discharge side of the station by a pipe 74.

Connected with the piston 70 and slidable through a stuffing box 75 in the cylinder head 68 is a rod 76 for operating a switch arm 77 of a rheostat switch mechanism 78 operably connected to the motors, as later described. The switch mechanism is mounted on the end of the base 66 opposite the cylinder and includes a pair of spaced arcuate-shaped housings 79 and 80 having their ends supported from the base by brackets 81 and 82 which also provide bearing supports 83 and 84 for slidably mounting the free end of the rod 76. Each housing carries a series of resistance windings for the compressor motors which will be hereinafter described in detail.

The facing sides 85 and 86 of the housings carry upper and lower sets of contacts 87, 88 and 89, 90, respectively adapted to be engaged by contact pins 91 and 92 extending through the upper end of the switch arm 77, as best illustrated in Fig. 10. The switch arm 77 includes a flat bar 93 having its lower end extending freely through a yoke member 94 formed in the piston rod 76 below the central portions of the arcuate housing and through a rectangular opening 95 formed in the top of the base 66.

With a centrifugal compression system laid out for maximum volume, fixed discharge pressure, and a given compression ratio at the respective stations, the variation in market demand might be met by speed adjustment of the compressors, but the stations would soon be out of balance if any variation occurred in pressure density values of the gas. This is because discharge pressure is a function of compressor speed for a given intake and pressure density of the gas.

At certain seasons of the year and at other times it is desired to lower maximum discharge pressures to avoid line leakage and danger of line blowout, or when operating on greatly reduced demand. The balance between pipe line flow and compressor characteristics would then be broken unless compensating means are provided to retain the stations in balance under pressure changes. I, therefore, provide automatic means to compensate for density changes so that the operating speeds of the compressors are similarly affected to balance the characteristics of centrifugal compression and pipe line flow, as now to be described.

Fixed to the lower end of the switch arm is a cross head 96 (Figs. 9 and 10) carrying a pair of pressure cylinders 97 and 98 arranged so that a cylinder is located on each side of the arm.

Extending outwardly from each cylinder at a point adjacent their upper ends are trunnions 99 and 100 for swingingly mounting the arm in bearings 101 and 102 carried on the base 66 at opposite side edges of the opening 95. Each cylinder is provided with a piston 103 having a piston rod 104 extending upwardly alongside of the switch arm to a point above the axis of the rod 76 where they are interconnected by a cross bar 105 extending through a slotted opening 106 formed longitudinally in the arm. The bar 105 preferably carries a roller 107 which is movable in the slot 106 and in angularly arranged slots 108 and 109 formed in ears 110 and 111 on the side bars of the yoke 94.

$P_1$ pressure is admitted to the lower ends of the cylinders 97 and 98 through a conduit 112 having one end connected with the conduit 74 and its opposite end coiled about the trunnions 100 and connected with the ends of the cylinders through branches 113. The $P_1$ pressure admitted to the cylinders acts against the pistons 103 to raise the roller 107 to the upper portion of the slots 106, 108 and 109 in the arm 77 and yoke 94 respectively, whereby the effective length of leverage applied to the switch arm through the piston rod 76 is varied according to the variation in the $P_1$ pressure or density change.

The pistons 103 are moved by the $P_1$ pressure against tension of springs 114 sleeved over the piston rods 104 and having one of their ends bearing against the upper end of the cylinders and their opposite ends bearing against the pistons, as best illustrated in Fig. 10.

The position of the roller 107 relative to the lever arm is thus controlled by the $P_1$ pressure counterbalanced against tension of the springs and any decrease in the $P_1$ pressure will cause the springs to move the pistons and effect shortening of the leverage applied to the switch arm 77, thereby effecting a greater movement of the switch arm over the resistance contacts for a given movement of the piston 70.

The contacts 87, 88 and 89, 90 are connected to resistance elements 115, 116, 117 and 118 respectively, which are enclosed in the arcuate-shaped housing of the switch previously described.

Attention is here called to the fact that in the wiring diagram shown in Fig. 28 the pairs of resistance elements 115—117 and 116—118 are shown in spaced dissociated relation with the arm 77 shown in full lines with the elements 115—117 and in dotted lines in association with the elements 116—118 for the sake of clearance.

Each resistance element is graduated toward the ends of the arcs so that when the switch arm 77 is engaging the sets of contacts 119, the resistance elements are out of circuit and the compressor motors will be operating at maximum speed and when the contact pins are engaging the resistance contacts at the ends of the arc, the resistances are brought into the motor circuits and the motors will be operating at their minimum speed, as later described in detail in connection with the various circuits necessary in operating a system in accordance with my invention.

In order to normally retain the switch arm on the center contacts to maintain the compressor motors at their maximum speed, during operation of the system, the $P_1$ pressure on the piston 70 is balanced by the $P_2$ pressure plus the tension of a spring 120 (Fig. 11) having one end engaging the piston and its opposite end the cylinder head 68.

In a balanced system it is thus apparent that since $P_1$ pressure is normally a constant value governed by the pressure regulator or master control 63, increase in the $P_2$ pressure added by the spring 120 would overbalance the pressure $P_1$ to shift the piston to the right (Fig. 11) to effect swinging movement of the switch arm 77 to gradually bring the resistance elements into the motor circuits and slow down the speed of the motors.

When the $P_2$ pressure drops, the $P_1$ pressure, of course, preponderates and the switch arm is shifted to remove part of the resistance elements from the motor circuits, thereby increasing the speed of the motors, building up the $P_2$ pressure, since, as stated, the $P_1$ pressure is normally retained constant, and therefore the speed of the compressors will be automatically retained at a certain value to maintain the $P_2$ pressure constant during normal flow through the line to supply gas, as called upon by the market.

Should the $P_2$ pressure drop in the line to a point below that required to retain the switch arm in position for maintaining the motors at their maximum speed, as in the case of failure to a compressor station or a line break, the $P_1$ pressure will effect movement of the switch arm over the resistance contacts on the left side of the segments (Fig. 11), thereby slowing down the compressor and if the $P_2$ drop becomes excessive, as is the case when a line break occurs, the switch arm 77 will be moved completely off the contacts, breaking circuits to the motors and stopping operation of the compressor.

In order to provide a stop for limiting movement of the pistons 70 in response to the $P_1$ pressure in the case of a line break, the cylinder head 68 (Fig. 11) is provided with a sleeve member 121 extending inwardly of the cylinder a sufficient distance to engage the piston 70 when the switch arm 77 is moved off the contacts. The sleeve thereby supports the spring in functional position within the cylinder and forms a stop for taking the thrust of the piston.

In case of drop in the $P_1$ pressure, as when the regulator 63 is set for a lower pressure, the springs 114 (Fig. 10) will move the pistons 103 downwardly in their respective cylinders 97 and 98 to move the roller 107 downwardly in the slots 106, 108 and 109 to effect anticlockwise movement of the switch arm 77. The drop in $P_1$ pressure simultaneously causes the switch arm to move in a clockwise direction (Fig. 11), but the compensating adjustment in the leverage connection maintains the speed of the compressor motors to prevent drawing the $P_1$ and $P_2$ pressures out of balance and retaining the load within the power range of the compressor motors.

It is thus to be noted that the pistons 70 adjust for demand changes through speed variation of the compressors, while the pistons 103 adjust for pressure density changes through relative arc movement of the lever 77 while holding the pressure ratio substantially constant over the density change. Therefore, compression ratios are substantially constant for constant speed throughout the pressure density change.

In order to supply current to the compressor motors at the respective stations, I provide power lines 125 and 126 (Figs. 28, 29 and 30) leading from suitable power stations, not shown, to connect with all of the stations in the system, the line 125 being connected to all of the switch arms 77 by conductors 127 and the line 126 to the common lead 128 of the compressor motors by conductors 129.

The low speed leads 130 (Fig. 28) of the motors 14 are connected to the contacts 119 of the resistance elements 115 and 117 of the speed control rheostats by a conductor 131 through contacts 132 and 133 of an electro-magnetic switch 134 and the contacts 135 and 136 of a similar switch 137. The corresponding lead of the motor 15 is connected to the contacts 119 of the resistance elements 116 and 118 by a conductor 138 through the contacts 139 and 140 of an electromagnetic switch 141 and the contacts 142 and 143 of a similar switch 144. Circuit through the conductor 138 is also normally broken by an electro-magnet 145 to delay starting of the motor 15 until the motor 14, or the spare motor, has started, as later described.

The corresponding lead of the motor 16 is connected by a conductor 146 with fixed contact 147 of the electro-magnetic switch 134 adapted to be engaged by a contact 148 when the switch is energized through a circuit 149 which is energized when current flows through the starter switch circuit, as later described, in case the motor 14 does not start.

The conductor 146 is also connected to a solenoid contact 149' which is normally retained in engagement with a fixed contact 147 that is also engageable by a contact 148 on the switch 141 when said switch is energized if the second motor fails to start. Contact 149' is retained from engagement with the contact 147 as long as current is flowing through the conductor 146. This is accomplished by connecting the solenoid into a circuit 150 carrying a current induced from the wire 146.

The circuit including the conductor 146 also has an electro-magnetic switch 151 similar to the switches 137 and 144, and which connects contacts 152 and 153 thereof to complete the circuit to the spare motor 16.

In initially starting the system the $P_1$ pressures are, of course, zero. Consequently, the switch arm 77 of the control regulators are in circuit breaking positions and it is impossible to energize the respective motor circuits without initially establishing the $P_1$ pressure at the respective stations. In accomplishing this, I provide a starter switch 154 for each station which is illustrated in Figs. 23 to 25 inclusive for initially starting the first compressor at each station to build up the $P_1$ pressure and effect movement of the switch arm 77 over the rheostat contacts of the respective regulators which normally control the operation of the motors.

Each starting switch includes a base frame 155 supporting vertical posts 156 connected at their upper ends with an arcuate segment 157 for supporting a rheostat housing 158. Mounted in the housing 158 is a resistance element 159 provided with a series of contacts 160 extending through the arcuate segment 157, (Fig. 23).

Mounted on the base 155 between the posts 156 is a bracket 161 having a bearing 162 mounting a horizontal shaft 163. Carried on the shaft 163 is a spring-tensioned switch arm 164 movable over the contacts 160 under influence of an electro-magnet 165 which is connected by conductors 166 and 167 to a starting circuit connecting the respective stations and which includes line wires 168 and 169.

The electro-magnet 165 includes an armature 170 (Fig. 23) having a head 171 engaging against a cam-shaped wing 172 fixed to the switch arm 164 so that when the electro-magnets of the starting switches are energized through the circuit wires 166 and 167 to raise the armatures 170, the heads 171 engage against the wings 172 to move the switch arms in a clockwise direction across the contacts 160, thereby placing the resistance elements 159 in series with motors 14 at the respective compressor stations, since the power line 125 is connected with the switch arm 164 of the starter switch through a conductor 173 and the high speed contact of the starter resistance 159 is connected by a conductor 174 with the conductor 131 leading to the motor 14.

Current is then flowing (Fig. 28) through the conductor 173, switch arm 164, contacts 160, conductor 174, conductor 131, switch contacts 132—133 and 135—136 to the motor 14, placing it in operation.

At the time the switch arm 164 has moved entirely across the resistance 159, the starting circuit is broken by the switch 175 and the circuit through the conductor 173 is broken by a switch 175'. However, the switch arm is retained in full position by a locking magnet 176 that is energized by circuit wires 177, 178 carrying an induced current from inductance coils 179 and 180 located in the field of coils 181 and 182 in the conductors 131 and 138 respectively.

As soon as the motors 14 begin operation, the compressors associated therewith will build up the $P_1$ pressures in the line to effect movement of the pistons 70 to move the switch arms 77 of the speed control rheostats, thereby completing circuit to the motors 14, from the line wire 125 through the conductors 127, switch arms 77, resistance elements 115, conductors 131, switch contacts 132 and 133, switch contacts 135 and 136 and conductor 130, so that the motors 14 are operating under control of the speed regulating rheostats responsive to the pressure differentials of the $P_1$ and $P_2$.

After the motors 14 have gotten under way and have initially built up the line pressures, the motors 15 are brought into circuit, as now to be described.

Located on the piston rod 76 of each speed regulator is a contact 185 (Figs. 9, 11, and 28) arranged to engage a contact strip 186 after the switch arm has moved a predetermined distance to close circuit through wires 187 and 188 which supplies current to the magnet switch 145 in the conductor 138 leading to the motor 15. Upon closing of the switch 145, current flows through the resistance element 116, conductor 138, contacts 139 and 140, contacts 142 and 143 to the motor 15, and back to the power line 126 through the conductors 128 and 129.

Should one of the motors 14 have failed to start, I provide mechanism for automatically bringing the spare motor 16 into circuit with the starter switch and the speed control regulator of that station.

This is accomplished through the electro-magnet switch 134 and a governor switch 189 mounted on the armature shaft of the motor 14. The governor switch is best illustrated in Figs. 26 and 27 and includes an insulated housing 190 keyed to the motor shaft by a spline 191. Mounted in the housing 190 are governor arms 192 and 193 normally retained in engagement with contacts 194 and 195 by a spring 196.

It is thus apparent that when the motor is idle, the spring will cause the governor arms 192 and 193 to complete a circuit through the contacts. However, when the motor is in operation, the governor arms will be moved by centrifugal force from engagement with the contacts, breaking circuit through conductors 197 and 197' connecting the contacts with the solenoid winding of the electric switch 134 (Fig. 28), the circuit receiving its current through an inductance 198 associated with a coil in the circuit of a lamp bank 199. This circuit includes a conductor 200 connecting the lamp bank with the conductor 128, and a conductor 201, which is connected to a contact element 202 mounted on the starter switch below the contacts 160 and which is arranged to be engaged by the switch arm 164 after the switch arm has moved about one-half of its travel. Thus a current is completed from the line wire 125, conductor 173, switch arm 164, contact 202, conductor 201, lamp bank 199, inductance 198 and conductor 200 which induces a current in the circuit 149 of the electric switch 134. This induced current effects closing of the contacts 147 and 148 to divert the power current from the starter switch to the spare motor through the line 146.

After the spare motor has built up the $P_1$ pressure sufficiently to cause closing of the contacts 185 and 186, the second motor is started, as previously described.

Should the motor 14 have started and the motor 15 have failed to start, then the spare motor is brought into the second motor circuit by the switch 141 which acts to close the contacts 148 and 147, diverting current to the spare motor.

Since the motor 15 will not operate, the governor switch 189 on the armature shaft will retain the switch circuit closed so that a current is induced therein to actuate the switch 141, the current being induced from a lamp bank circuit 205 which includes a contact 206, engageable with the switch arm 77 that is connected to one of the terminals of the lamp bank 207 by a conductor 208. The other terminal of the lamp bank is connected to the return conductor 128 to complete a current through an inductance coil 209 that is associated with a coil 210 in the governor switch circuit.

In order to prevent current from flowing through the governor switch circuit when the spare motor is operating in place of the motor 14, the solenoid contact 149' is moved from engagement with the contact 147 by the current induced in the circuit 150 from the current flowing through the conductor 146.

If the trunk lines supplied only one market and that at its terminal end, and if all the stations were exactly spaced with the compressors of equal displacements, the pressure regulators just described would be sufficient for maintaining uniform movement of gas through the line. However, varying station spacing, roughness of surfaces, withdrawals of gas en route, and other varying conditions prevent stabilization of $P_1$ pressures over the entire length of the line to the value set at the control point by the regulators 63.

Therefore, to maintain a predetermined $P_1$ value at each of the stations corresponding to the pressures set at the regulator 63, I employ a stabilizer apparatus for effecting momentary speeding up of the compressor motors when the $P_1$ pressure at the respective stations tends to drop below the predetermined set pressure. The stabilizer construction is illustrated in Figs. 18 to 22 inclusive, there being a stabilizer located in each of the compressor stations as well as a pop valve to prevent $P_1$ pressure exceeding its set value.

Each stabilizer includes a base 212 having an upwardly extending bracket 213 for supporting a pressure actuated switch mechanism 214. The switch mechanism includes a cylindrical housing 215 comprising a rear disk portion 216 fixed to the upper end of the bracket 213 by screws 217 extending through the bracket and into threaded openings in the disk.

Supported by the disk portion is a dial portion 218 having a peripheral flange 219 provided with an inwardly extending flange 220 engaging the face of the disk 216 and to which it is secured by screws 221 extending through the disk 216 and into threaded openings in the flange.

Formed in the dial portion 218 and on the disk portion 216 are bearing bosses 222 and 223 for rotatably mounting a shaft 224 carrying a dial hand 225 arranged to move over the face of the dial in response to actuation of a Bourdon tube 226.

The Bourdon tube 226 is supported on the inner face of the disk 216 and has one end fixed to a nipple 227 mounted in the disk and connected with a conduit 228 carrying the $P_1$ pressure on the discharge side of the respective compressor station with the exception of the main control station which has its stabilizer connected by a conduit 228' (Fig. 4) with the line 5 on the market side of the regulator 63, thus making this particular stabilizer responsive to market fluctuations, as later described. The opposite end of the Bourdon tube is connected by a link 229 with a depending arm 230 of a gear segment 231 which is pivoted on a stud 232 extending from the inner face of the disk at a point adjacent one end of the shaft 224. Meshing with the segment is a gear 233 that is keyed to the shaft 224 at a point adjacent the boss 223.

It is thus apparent that variation in the $P_1$ pressure will actuate the Bourdon tube to effect rotation of the shaft 224 and movement of the dial hand 225 over the face of the dial 218 and over pressure graduations 234 representing the various discharge pressures that may be carried at the discharge side of the respective stations.

The dial hand 225 is connected in circuit with a switch mechanism 236 (Figs. 10 and 12) so that when the $P_1$ pressure drops below the predetermined set pressure, the switch mechanism will be actuated to short out a portion of the resistance elements of the speed control regulators and effect a higher speed of the compressor motors building up the $P_1$ pressures to the predetermined value.

Cooperating with the dial hand is a contact segment 237 (Figs. 18 and 21) fixed to the inner face of a gear ring 238 that is rotatably mounted on the outer face of the flange 219 previously described, the gear ring being retained on the flange by an inwardly extending tongue 239 engaging in an annular groove 240 formed in the outer face of the flange at a point adjacent the disk 216.

The gear ring extends outwardly from the face of the dial and carries a glass panel 241 to protect the dial hand and the contact 237. Fixed to the outer face of the gear ring is a worm gear 242 meshing with a worm 243 that is fixed to a shaft 244 rotatably supported in bearings 245, 246 fixed to the ends of the base member 212 (Fig. 18), whereby the gear ring may be rotated to locate the contact 237 at a point on the dial representing the pressure to be carried on the discharge side of the respective station.

For example, if the $P_1$ pressure is to be maintained at 600 lbs., the end 247 of the contact will be moved into alignment over the 600 mark on the dial. Therefore, when the pressure tends to drop below 600 lbs., the Bourdon tube will cause the dial hand to engage the contact 237 and effect energization of the switch mechanism 236 to reduce the effectiveness of the rheostat elements and cause speeding up of the motors to build up the $P_1$ pressures to 600 lbs.

As soon as the pressure has been built up to 600 lbs., the Bourdon tube will effect movement of the hand from engagement of the contact to return the motors to their normal operating speed.

The switch mechanism 236 (Figs. 12 and 28) includes solenoid coils 248 and 249 carried in housings 250 and 251 that are fixed to the arcuate-shaped housings 79, 80. The windings of the solenoids 248 and 249 are connected to the shaft 224 by a conductor 252 and to the contact 237 by a conductor 253. The conductor 252 is connected to a metal ring 254 having a bearing opening 255 for receiving the end of the shaft 224 at the end opposite to the dial hand 225, the bearing ring being supported in a recess 256 formed in the bracket 213 in axial alignment with the shaft.

It is thus apparent that when the dial hand engages the contact, a circuit is established from a battery 257 (Fig. 28) through the conductor 253, contact 237, dial hand 225, shaft 224, contact ring 254, and conductor 252 for energizing armatures 258 of the solenoid coils 248 and 249.

Energization of the armatures causes them to engage rods 259 and 260 slidably mounted in bearing openings 261 and 262 in the top and bottom walls of the respective housings 79 and 80 to move contacts 263—264 and 265—266 into shorting engagement with the rheostat elements to short a sufficient amount of resistance from the motor circuits to effect an increase of speed in the compressors to build up the $P_1$ pressure to that set by the contact 237.

When the dial hand moves off the contact 237 springs 268 return the rods 259 and 260, thereby disengaging the contacts 263—264 and 265—266 from the resistance coils.

In order that all of the stabilizers may be controlled at the regulating station, I provide a remote control mechanism for actuating the shafts 244 when setting the contacts 237 as now to be described.

Located at the control station is a stabilizer control mechanism 270 (Figs. 13 to 17) which includes a base 271 for supporting a bracket 272 which mounts a fixed dial 273 similar to the dials on the stabilizers previously described, the dial 273 being fixed to the supporting bracket by screws 274, as illustrated in Figs. 13 and 14.

Formed on the bracket 272 in axial alignment with the dial 273 is a bearing post 275 rotatably mounting a shaft 276 extending through an opening 277 in the dial and carrying a dial hand 278 complementary to the dial hands 225 previously described. The dial hand 278 is moved over the face of the dial through a worm gear 279 fixed to the opposite end of the shaft 276 by a spline 280 and which is driven by a worm 281 fixed to a shaft 282 that is rotatably mounted in bearings 283 and 284 at opposite ends of the base.

The shaft 282 is provided adjacent the bearing 283 with a hand wheel 285 whereby the shaft is rotated to operate the worm to position the dial hand over the dial marking 286 representing the pressure which is to be maintained at the respective stations.

Movement of the dial hand from one position to another requires a set number of revolutions of the shaft 282 and a corresponding number of revolutions of the shafts 244 to set the contacts 237 at the pressure indicated by the hand 278 and to translate the revolutions of the shaft 282 to all of the shafts 244 of the respective stabilizers I provide an electrical impulse sending mechanism which is operated simultaneously with the setting of the dial hand 278 whereby the electrical impulses generated during setting of the hand actuate motors 287 for imparting rotation to the shafts 244.

The impulse sending mechanism includes a contact member 289 fixed to the end of the shaft 282 opposite to the hand wheel at a point between the bearing 284 and a complementary bearing 290. The member 289 includes a cam portion 291 having a plurality of equally spaced high lobe portions 292 and intermediate dwell portions 293 arranged to rotate over a brush contact 294 supported on an insulating block 295 carried on the base 271.

Also carried on the block 295 is a brush contact 296 arranged to engage the periphery 297 of the contact member 289 adjacent the cam portion 291. The contact member thus described is insulated from the shaft 282 by an insulating core 298 which is keyed to the shaft by splines 299.

When the shaft 282 is rotated by the hand wheel in setting the dial hand, the contact member 289 will be simultaneously rotated to progressively move the high lobe portions of the cam into successive engagement with the brush contact 294 to establish a corresponding series of current impulses over the circuit including a conductor 300, brush 294, contact member 289, brush 296 and a conductor 301 which is connected to a binding post 302 on a reversing switch 303.

The reversing switch 303 (Fig. 17) includes a rectangular housing 304 that is supported on a bracket 305 forming an extension of the bearing 284. Mounted on the housing 304 in spaced relation with the post 302 is a complementary post 306 which is connected with a lead line 307 cooperating with the lead 301 for conveying a current to the reversing switch.

Mounted at opposite ends of the housing 304 in alignment with the posts 302 and 306 are pairs of posts 308—309 and 310—311 of which the posts 309 and 310 are interconnected by a conductor 312 and the posts 308—311 by a conductor 313. Also connected to the posts 308 and 310 are line wires 314 and 315 connecting all of the stabilizers at the compressor stations.

Slidably mounted in the housing 304 is a switch block 316 carrying spaced contact strips 317 and 318 having resilient ends 319 and 320 for engaging depending terminals 321 on the binding posts previously described.

The block 316 is slidably moved transversely in the housing by an arm 322 having its lower end 323 frictionally mounted on a projecting end 324 of the shaft 282 and its upper end extending through a slotted opening 325 in the bottom of the housing and through a slot 326 in the block 316. The upper end of the arm carries a cross head 327 engaging the grooves 328 formed in ears 329 extending upwardly from opposite sides of the block. The lower end of the arm which is frictionally engaged with the shaft includes a split hub 330 sleeved on the shaft and which is provided with spaced clamping ears 331 and 332 through which a bolt 333 is extended and which carries a coil spring 334 having one end engaging against a head 335 of the bolt and its other end against the ear 331 of the split hub 330.

Threaded on the end of the bolt are lock nuts 336 for adjusting tension of the spring 334 and consequently the frictional engagement of the split hub with the shaft. When the shaft is rotated in a clockwise direction (Fig. 13) the contact strips 317 and 318 will be moved to interconnect the bearing post 310 with the post 302 and the post 311 with the post 306 so that as the high lobe portions of the cams engage the brush 294, a current flows through the line 300, brush 294, contact member 289, brush 296, conductor 301, binding post 302, contact strip 317, post 310, and through the line wire 315 to the electrical mechanism of the respective stabilizers and returns through the line wire 314, binding post 308, conductor 313, binding post 311, contact strip 318, binding post 306 to the conductor 307, thereby completing an electrical circuit through the stabilizer actuating mechanism.

As soon as the high lobe portion moves out of engagement with the brush 294, the circuit will be broken, but continued rotation of the shaft brings a succeeding high lobe portion of the contact member into engagement with the brush, reestablishing the circuit and sending another impulse to the stabilizers.

It is, therefore, apparent that when the hand wheel is rotated in a clockwise direction (Fig. 13) to move the dial hand 278 for setting a higher $P_1$ pressure at the respective stations, a series of successive impulses will travel through the line 315 in one direction and return through the line 314, and when the hand wheel is rotated in the reverse direction for setting a lower $P_1$ pressure, friction of the shaft with the clamping portion of the arm 322 will cause movement of the block carrying the contact strips 317 and 318 in the opposite direction to engage the binding posts 302—308 and 306—309, respectively to reverse the sending current.

At the time the resilient ends of the contact strips engage the binding posts, the end of the block 316 will engage an end wall of the housing and continued rotation of the shaft will cause the shaft to slip within the split hub portion of the arm 322 so that rotation of the contact member may be continued to send out the required number of impulses.

When the current is reversed it flows from the conductor 300, contact member 289, brush 296, conductor 301, binding post 302, contact strip 317, binding post 308, and through the line wire 314 to the respective stabilizers and is returned through the line 315, binding post 310, conductor 312, binding post 309, contact strip 318, and binding post 306, to the line conductor 307.

It is thus apparent that when the hand is moved in one direction, the impulses will be sent out on the line 315 and when the hand is moved in the reverse direction, impulses will be sent out on the line 314.

Mounted on the stabilizer bases 212 (Figs. 18 to 22 inclusive) at opposite sides of the shafts 244 are pairs of electromagnets 337—338 and 339—340. The windings of the magnets in each pair are connected in series and the pairs are connected to the lines 314 and 315.

Mounted on the base adjacent the magnets 337 and 340 are brackets 341 and 342 carrying switches 343 and 344 respectively. Each switch includes a fixed contact 345 having a spring leaf portion 346 arranged to be engaged by a contact member 347 pivotally supported on a pin 348 projecting laterally from the face of the bracket 341 or 342. The contact member 347 is provided with a rearward extension 349 extending over the core 350 of the magnet 337 in the instance of the switch 343 and over the core of the magnet 340 in the case of the switch 344.

The extensions of the contact members are permanent magnets, one being a north pole and the other a south pole, so that when the current flows through the magnet 337 in one direction, the contact member 347 will be attracted by the core 350 to effect closing the circuit from a line 168 through a conductor 351, switch 343, conductor 352, to the motor 287 and through a conductor 353 to the line wire 169, while the current flowing through the magnet 340 will repel the contact member 347 of the switch 344 to break the circuit from the conductor 351 and conductor 354 to the motor 287.

Also supported by the base 212 adjacent the magnet 338 and 339 are brackets 355 and 356 and extending therefrom are pins 357 for pivotally mounting latch members 358 and 359 having latch portions 360 extending over ratchet wheels 361 and 362 that are fixed on the shaft 244.

The latch portions 360 engage teeth 363 on the ratchet wheels, as clearly illustrated in Figs. 18 and 22, the teeth on the ratchet wheel 361 being arranged reversely to the teeth on the ratchet wheel 362.

The latch members are provided with outwardly extending permanently magnetized ends 364 and 365 having opposed polarity and extending over the poles 366 and 367 of the magnets 338 and 339.

It is thus apparent that when the magnet controlling the switch 343 is energized to close the respective circuits to the motor 287, the current flowing through the magnet 338 will simultaneously attract the latch member to effect its release from engagement with the ratchet wheel 363 to allow movement of the shaft 244 in an anti-clockwise direction (Fig. 18) and when the magnet 340 is energized, the magnet 339 will be energized to release the other latch member 359 to permit clockwise rotation of the shaft 244.

The latch members are yieldingly retained in engagement with the ratchet wheels by spring-pressed plungers 371 and 372 slidably mounted in bearings 373 and 374 extending from a T-shaped bracket arm 375 on a post 376 supported by the base 212. The plungers are retained in yielding engagement with the latch members by springs 377 having one of their ends engaging a head 378 on the plungers and their opposite ends engaging against the bearings 373 and 374. The springs are adjustably tensioned by adjusting nuts 379 threaded on the upper ends of the plungers.

To connect the shaft 244 with the motor 287, the shaft 244 is provided with a gear 380 meshing with the pinion gear 381 on the motor shaft 382 to operate the worm 243 and effect movement of the contact 237 responsive to movement of the dial hand 278.

If one of the stations fails to start, the switch arm of the speed control regulator for that station will remain in circuit breaking position since the $P_1$ and $P_2$ pressures are zero, or are at least equalized. In this position the switch arm closes a switch 385 (Fig. 28) closing a circuit to the next station in the direction of the market through conductors 386 and 387 which are connected to solenoid switches 388 and 389.

Upon energization of these solenoids, the resistance elements 115 and 116 are removed from the motor circuits and the resistance elements 117 and 118 are brought into circuit with the motors of that station. Simultaneously with switching of the resistance circuits, the electromagnetic switches 137, 144 and 151 are energized by the same circuit to break the circuit to the low speed leads of the motors and to connect the high speed leads 390 (Fig. 28) so that the motors are placed in high speed operation.

With the motors operating on high speed, the $P_1$ and $P_2$ differentials are altered at that station to effect a sufficient pressure drop for flow of the gas over the greater distance between the operating stations, for example, a drop from 28 lbs. to 35 lbs. in the instance illustrated; but owing to the fact that the motors' line current has been shifted to the high speed winding of the motors, the horse power of the motors and compressor displacement are retained in balance and within their rated power to reestablish the set discharge pressure in the next leg of line from the lower intake pressure caused by the greater pressure drop from carrying the fluid through the greater distance.

Should one of the stations shut down after it has been in operation, the $P_1$ and $P_2$ pressures for that station would become equalized and the switch closed to automatically shift the next station to operate at a higher differential ratio in the same manner as described above when the station has failed to start.

On bypassing or stopping of a station, the overrunning clutches 20 (Fig. 8) prevent rotation of the motors by the centrifugal compressor.

Whenever the shut-down station is started up, it will immediately effect a difference in the $P_1$ and $P_2$ ratio of that station, bringing the speed regulators into service and breaking the skip stop circuit through the wires 386 and 387 (Fig. 28), thereby returning the speeded-up station to normal working load.

When the predetermined maximum pressures are for any reason materially exceeded at a station point, the compressors are automatically shut down due to the fact that the contact arm 77 for that station has been moved by its actuating piston 70 in anti-clockwise direction (Fig. 28), to break circuit to the compressor motors. Also when the motors are shut down due to an abnormal drop on the intake side of the station, that is, when the $P_1$ and $P_2$ ratio has become too great with the $P_1$ pressure normal, some means must be provided to prevent actuation of the starter for that station or stations until the $P_1$ and $P_2$ ratio tends to drop below the shut down point or until the $P_2$ pressure is brought back to safe operating conditions as the case may be.

This is accomplished by inserting a solenoid switch 267 (Fig. 28) in the circuit wires 166 to normally open circuit to the magnets 165 which actuate the starter switch arms 164. The solenoid windings of the switches 267 are connected in circuit with the conductors 252 and 253 leading to the stabilizer contacts 237 and contact arms 225 respectively. It is apparent that when the above mentioned conditions occur, the contact arms 225 have moved off the strips 237 because $P_1$ pressure is at its required value and no current is flowing through circuit including the batteries 257. Consequently, no current is flowing through the solenoid windings of the switches 267 and, therefore, the starter operating circuits are opened thereby.

As long as the station or stations are shut down, the operating stations in the direction of market soon start pulling down the $P_1$ pressures at the shut-down stations. This causes the stabilizers in the shut-down stations to act so that the contact arms 225 thereof are moved into circuit closing position with their contact strips 237, thereby energizing the solenoid switches 267 and reestablishing the starter circuits.

When the pressure in the market leg of the line tends to drop below that at which the stabilizer at the main regulating station is set, the compressors for that station are automatically speeded up to reestablish that pressure. This causes pulling down of the intake pressure, but such drop produces increased velocity flow through the line back to the next booster station, effecting increase in the compressor speed and so on back through all of the booster stations in the line.

I also provide other means for effecting increased flow of gas at such times when the $P_1$ pressure in the market leg of line may drop below the $P_2$ pressure of the preceding station. This means is accomplished by automatically bleeding gas around the master regulator 63 (Fig. 4) through a bypass line 395 having its ends connected with the inlet line of the station and the main flow line on the market side of the regulator respectively. Flow through the bypass is automatically controlled by a pressure regulator 396 set to maintain a pressure differential of 28 lbs.

The regulator 396 (Fig. 5) includes an ordinary globe valve 397 having a piston cylinder chamber 398 supported on the valve bonnet 399. Slidable in the cylinder is a piston 400 movable responsive to the $P_1$ and $P_2$ pressure ratio, the $P_1$ and $P_2$ pressures being admitted to the cylinder through conduits 401 and 402 connecting the opposite ends of the cylinder with the inlet side of the station and the outlet side across the pressure regulator 63.

In order to load the piston on the $P_2$ side to balance the piston against the $P_1$ pressure with the valve in closed position at the predetermined ratio (or 28 lbs. differential), I provide a spring 403 having one end bearing against the piston and its opposite end against a spider 404 movable in the cylinder by an adjusting screw 405.

Thus it is apparent that when the $P_2$ pressure plus the spring pressure underbalances the $P_1$ pressure at the delivery side of the pressure regulator, the valve will be closed, but should the $P_2$ pressure tend to rise, the $P_1$ pressure in the market leg being constant, will cause opening of the valve and allow bypassing of gas around the station, which causes a greater drop in the $P_2$ pressure. Dropping the $P_2$ pressure, of course, drops the $P_1$ pressure at the next preceding station with the result that the stabilizer for that station will speed up the compressors to maintain the required $P_1$ pressure pulling down the $P_2$ pressure and causing a like stabilizing of the $P_1$ pressure at the next preceding station and so on consecutively back to the field supply.

I also provide the control station bypass with a branch line 406 (Fig. 4) having a regulator 407 similar to the regulator 396 which is set to a pressure differential of 35 lbs., so that the gas may be bypassed when the control station is operating on the skip stop plan as above described.

A second branch 408 is also provided with a throttle valve 409 whereby the operator may draw down the $P_2$ pressure to speed up movement of gas through the line.

As a further manual control to maintain $P_1$ pressure in the market leg, a switch 237' (Fig. 4) is inserted in the circuit of the regulating station stabilizer to be manually operated for energizing the solenoid coils 248 and 249, thereby shorting out sections of the resistance to effect increase in the compressor speed.

The compressors of each station are also equipped with bypasses 410 (Fig. 2) having pop-off valves 411 which are set at the maximum $P_1$ value to protect the lines against pressures in excess of the predetermined amount. When the $P_1$ pressure exceeds the set pressure of the pop-off valves 411, gas is bypassed to the inlet sides of the compressors to prevent excessive pressure on the outlet sides. The bypasses 410 are equipped with suitable shut-off valves 412 and 413, as shown in Figs. 1, 2 and 4. The bypasses 395, 406 and 408 at the control station (Fig. 4) are equipped with suitable shut-off valves 414 to control flow through the respective bypasses when the station is operating on skip stop plan, so that the gas will be bypassed. To prevent back flow through the bypass 395 it is equipped with a suitable check valve 415.

In case of a break in the line, as indicated at 416 in Fig. 29, the gas would exhaust therethrough from both directions at high velocity, thereby causing the double acting checks 417 and 418 nearest the break to seat, closing the broken ends of the line to conserve the gas.

In order to prevent the stations in the direction of the market from disturbing the line pressures, I provide for automatically stopping the compressors in those stations upon actuation of the check 418 (Fig. 29). When the stations toward the market are shut down, the market is supplied from the reserve storage in the market leg 10 of the line plus storage afforded by bleeding the station legs upon lowering the $P_2$ pressure at the control station and permitting the excess gas to flow under its own energy toward the market.

I also provide for automatically shutting down the first station on the field side of the break upon closing of the check 417, but I allow for continued operation of the compressors at the other stations toward the field end of the line to pack that portion of the line, so that after the break is repaired the stored gas can be flooded ahead to make up for the lowering of the $P_2$ pressures at the market end of the line.

Shutting down of the station in the direction of the field is accomplished by equipping the check valves on their outlet sides with contacts 420 and 421 adapted to be closed when the check member engages the outlet seat to close a circuit through conductors 422 and 423 connected to the opposite terminals of a battery 424 located at the preceding station.

Upon closing of the circuit a current is passed from the battery through an electro-magnetic switch 425 having contacts 426 and 427 connected in the circuit of the holding magnet 176 to effect release of the switch arm 164, thereby breaking circuit to all of the motors which are in operation and stopping the compressors at that station. Also connected in the circuit including the conductors 422 and 423 is an electro-magnetic switch 428 for breaking the circuit through the conductor 127 supplying current to the speed control regulators to prevent the regulators from supplying current to the motors.

When the starter switch arm 164 is moved to circuit breaking position, it engages a switch 429 (Figs. 23 and 29) controlling a circuit from the battery through a magnetically operated switch 430 having contacts 431 and 432 connected in a brake circuit which sets the brakes 19 of the motors, and locks the compressors against rotation independently of the operation of the motors. The brake circuit includes a conductor 433 (Fig. 29) connecting one of the leads of the brake operating magnets with an inductance coil 434 that is supported in conductive relation with a coil 435 connected to the line wires 125 and 126, and a conductor 436 connecting the other lead of the brake magnets to the other lead of the inductance coil through the contacts of the electro-magnetic switch 430.

Upon seating of the check member 418 on the inlet side of the valve, contacts 437 and 438 (Fig. 3) are closed to complete a circuit through the conductors 439 and 440 which are connected to the leads of the battery 424 at the next station from the break in the direction of the market, thereby causing a current to flow through the winding of a magnetic switch 441 in the brake circuits of the respective stations.

The brake circuits of each station are connected in multiple with the brake circuits of the other stations through the switches 441. The switches 441 include an armature 442 having contacts 443 and 444 at its opposite ends to engage fixed contacts 445 and 446 respectively, the contacts 444 and 445 being connected to the conductors 433 and 436 and the contact 446 with the conductor 433 of the preceding station by a conductor 447 while the contact 443 is connected by a conductor 448 with a line wire 449 common to all of the stations.

Attention is directed to the fact that when the line is under normal operation, the contacts 444 and 446 (Fig. 29) are closed and the contacts 443 and 445 are open, but when a switch 441 is energized upon seating of a check member on the inlet side of the valve, the contacts 444 and 446 for that switch are opened and the contacts 443 and 445 are closed. For example, upon closing of the check 418 the switch of the next station toward market was energized, closing contacts 443 and 445 and completing a circuit from the inductance coil 434 through the conductor 433 and line wire 447 to the contact 446 of the switch 441 of the next station in the direction of the market through the contact 444 to the conductor 433 and to the complementary contacts of the succeeding stations. Attached to the conductors 433 of each station is a conductor 450 leading to the winding of solenoid switches 451 in the circuit of each battery.

It is thus apparent that when a current flows through the contacts 444 and 446 in the direction toward market, all of the switches 451 are energized to close the battery circuits through conductors 452 and 453 connecting the conductors 422 and 423, shutting down all of the stations in the direction of the market.

The electrical power required to operate the compressors may be supplied from town power plants or from other independent sources along the route of the line as shown in Fig. 30, or the power may be supplied from such sources where available and other power may be generated especially for the transportation service, for example, a power station located at one or more of the compressor stations on the line.

It is preferable, however, to provide power generating stations in conjunction with the pipe line and located at suitable locations according to economic electrical transmission practice.

Figure 31:
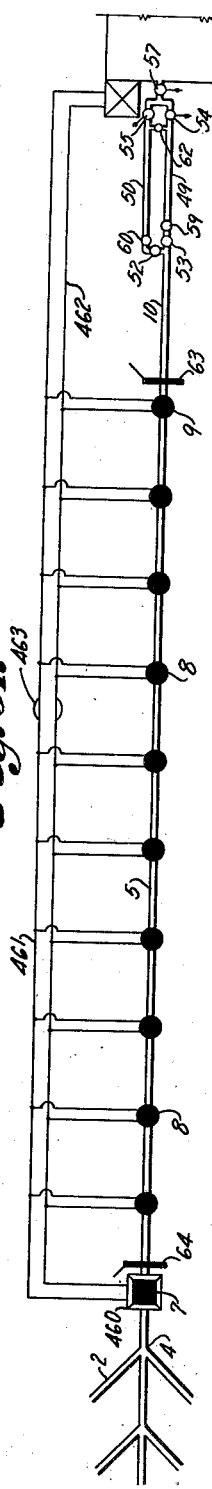
Fig. 31 is a similar diagrammatic view of a power lay-out wherein the current is supplied from terminal power plants.
Figure 32:
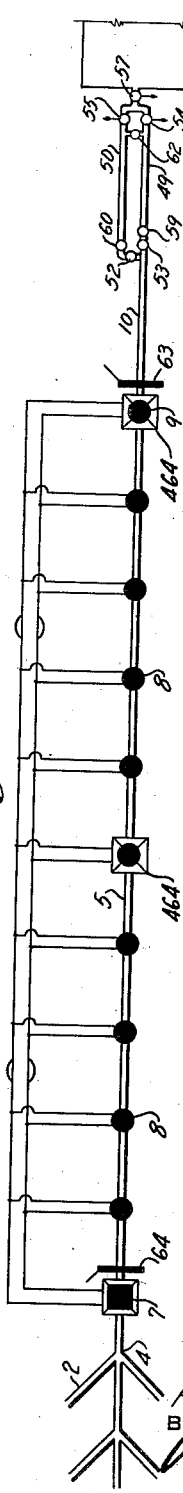
Fig. 32 is a similar diagrammatic view showing the current supplied from wayside power plants located along the line at selective booster stations.

Such an arrangement of power stations is illustrated in Fig. 31 where power generating plants are located at the terminal ends of the line such as at the field station 7, and at the market as indicated at 460 to supply power lines 461 and 462 tied in at a point near the middle distance of the line, as at 463. On longer lines, it is desirable to provide intermediate power stations at certain of the booster stations, such as at 464, one of which may include main control station 9.

Where fuel for the power plants is furnished from the line it is desirable that they be placed near the field end of the line so that the fuel withdrawn does not reduce the transport and storage capacity of the line. The power plant at the control station 9 or a spare plant near the last station is depended upon as a spare.

The power plants would ordinarily deliver power normally in the direction of the gas flow but if any of the main power plants should become incapacitated, the spare plant could be put into service for delivering current in counter-flow back to the disabled power plant, substituting through this reversed current flow each following power plant for the preceding plant up to the disabled one.

Figure 33:
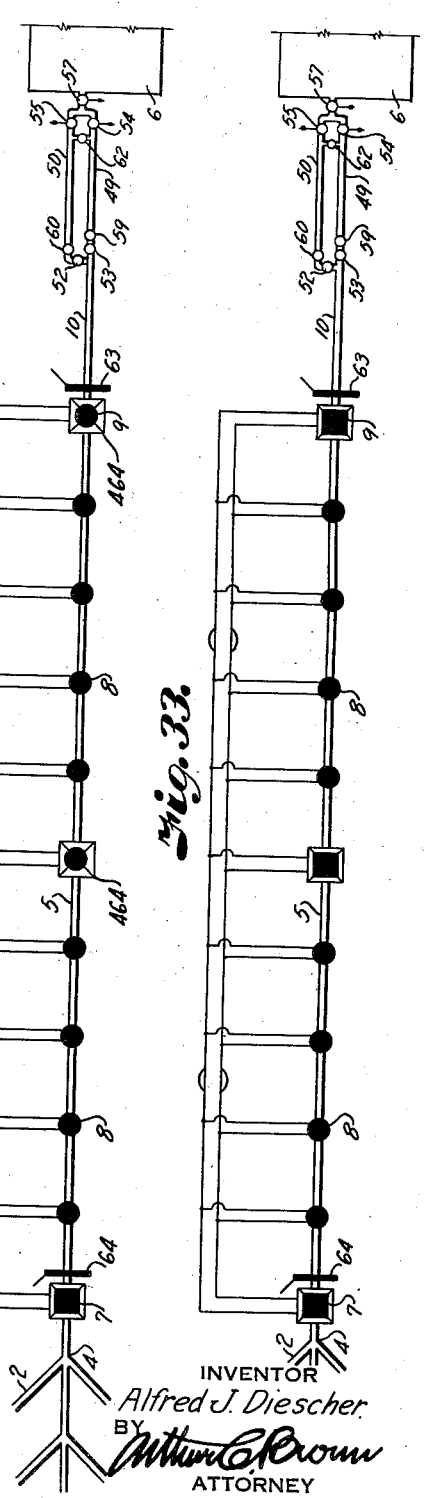
Fig. 33 is a similar diagrammatic view showing the current supplied from power plants located at compressor stations that are interposed between series of booster stations.

In Fig. 33 the power plants are shown inserted in the line between groups of booster stations with the power plant at the control station 9 serving as the spare.

In operating a transportation system constructed and assembled as described, the entire line flow and the station operation is centered at the last station toward the market end of the line, or the last station on the line (Fig. 4) which is to be operated under my method.

The master regulator 63 (Fig. 4) at that station is set to the line or $P_1$ pressure desired depending upon the operating season and the nature of the market being supplied. The field regulator 64 (Fig. 1) is also set to a corresponding pressure to provide closer regulation of the line pressures and to prevent the $P_1$ pressure from exceeding its predetermined value in the case that the field pressure should rise above the $P_1$ pressure desired.

The starter circuit (Fig. 28) including the line wires 168 and 169 is closed at the control station to effect movement of all of the starter switch arms 164 across the resistances which are connected into the circuits of the motors 14 to start operation thereof to build up the $P_1$ and $P_2$ differential at opposite sides of the check valve 29 at the respective stations.

As soon as the pressure $P_1$ preponderates over the pressure $P_2$ plus the tension of the springs 120 (Fig. 11), the switch arms 77 are moved onto the resistance elements 115 and 116 (Fig. 28) of the speed control regulators, thereby placing the motors 14 under control of the $P_1$ and $P_2$ differentials at the respective stations (Figs. 1, 2 and 4).

When the contacts 185 on the speed regulators engage the contacts 186, the motors 15 are brought into the circuit to aid the motors 14 in building up the $P_1$ pressure to that set by the regulator 63. Should one of the motors at any of the stations fail to start, the current will be shifted to the spare motor at those stations, so that there are two motors operating at each station until the desired $P_1$ pressures have been attained.

The operator at the control station moves the hand wheel 285 (Fig. 13) of the stabilizer regulator to set the dial hand 278 to the $P_1$ pressures desired. Simultaneously with the setting of the dial hand, current impulses are dispatched over the stabilizer circuit including the line wires 314 and 315 to the setting mechanism of the stabilizers at all of the other stations to set the contact 237 thereof in position for maintaining the $P_1$ pressures at their respective stations at the value set by the pressure regulator 63 (Fig. 4).

If any of the $P_1$ pressures are not at the required amount, the dial hand 225 (Fig. 18) will engage the contact 237 to effect speeding up of the motors at those stations until the $P_1$ pressure is the desired amount.

The system is now operating with the discharge pressures at the respective stations on the basis of $P_1$ as a constant and variation in load demand causes variation in the $P_2$ pressures, but the range or difference between $P_1$ and $P_2$ is limited since speed or volume output of the compressors is controlled by the speed regulators.

It is thus apparent that the entire length of the line is always practically full of gas with the volume varying only to the narrow limit which is necessary to cause flow between the station spacings.

As all stations are now under automatic speed control and that governed by the regulator 63, a change in the market demand causes a corresponding change in speed and consequently output volume in each station throughout the length of the line, so that the entire body of gas is moved toward the market as a column having, in a sense, a slight ripple in the flow as it passes each station.

The control of the master regulator is transmitted through the column of gas back along the line to each station acting on the pressure relationships of $P_1$ and $P_2$. When a change commences to occur at the station, the differential regulator mechanism tends to counteract the change by increasing the speed of that station.

The critical point of the whole system is, therefore, the section of the line between the inlet of the last station and the master control regulator ahead of it in the direction of the market where the $P_1$ pressure is retained at the required value.

The holding of $P_1$ pressure is most important for it is this pressure on which the basis of the entire control and the efficiency of the service is effected. The operator at the control station is the engineer at the throttle since he runs the entire plant.

When the seasons or market justify a lower line pressure, $P_1$ can be dropped at the master control regulator 63 (Fig. 4) which causes a line drop throughout the length of the line so that the high pressure value of $P_1$ need not be carried longer than is necessary to efficiently render the necessary service to the market.

To lower the $P_1$ pressure the field station regulator 64 (Fig. 1) is set at the new $P_1$ value on orders from the operator of the control station, thus cutting the amount of gas delivered into the trunk line. Until $P_1$ approaches its new value, the field station is shut down or is kept operating on very low speed until its discharge pressure drops to below the new $P_1$ value.

The relay stations continue their operation with each station robbing the preceding station until its $P_1$ pressure reaches the new value of $P_1$ at which point the station maintains the new value. This results in a breast of $P_1$ pressures of every range between the old and new $P_1$ value to advance along the line until the $P_1$ at the market leg reaches a new $P_1$ value when the master regulator of the station is adjusted to the new value. The stabilizers will, of course, also be set to operate at the new $P_1$ value.

On reversing this process to build up $P_1$ to a new higher value, the movement starts at the field station where the regulator 64 is adjusted to the higher pressure and the field station is speeded up to maintain the new $P_1$ value.

A breast or surge of higher $P_1$ (every range between the old and new $P_1$ values) is advanced along the line working against the heel of the older $P_1$ value and advancing this heel until it reaches the master regulator 63. The regulator 63 is then gradually adjusted until it reaches the new $P_1$ value. During such adjustment the relay stations continue to operate, those near the field operating faster than those closer to the market; the volume difference passing the higher speed stations is absorbed in filling the line space to the higher $P_1$ value while the lower speed stations pass only the difference to the market end so do not change their speeds, nor $P_1$ value until the heel of the advancing breast reaches and passes each succeeding relay station.

As the value of $P_1$ rises, the differential pressure of $P_1$ and $P_2$ over a single station changes to keep the load within the power capacity of the station motor power. This is accomplished through the automatic adjustment of the switch arms of the speed control regulators by the $P_1$ pressure acting against the piston 103 controlling position of the connection between the switch arms and their actuation rods.

When the $P_1$ pressure is to be lowered seasonally it can also be accomplished by setting the master control regulator 63 to the new value, permitting exhaustion of surplus gas from the station legs to the market leg. At the same time, the field station regulator is set to the new value and the feed into the line can be reduced or stopped until the $P_1$ value at the pressure regulator 64 approaches or reaches its new setting.

If the $P_1$ pressure is set for its true seasonal load value, the line is always full of gas to back up the sudden change in the market demand to the full line capacity. For sudden changes over and above the line capacity the storage in the market leg of the line is utilized to carry the market over sudden peak demand periods.

In a line employing closely spaced stations, each operating on narrow compression ratio with automatic compressor speed regulation, it is desirable to have ample storage space in the market leg or legs of the line, because it is through this storage that the market is supplied during times of excess demand and by reason of such storage it is not necessary to provide fine adjustment in compressor regulation. This simplifies the controllers because they can be of the step-by-step contact type such as illustrated in the drawings rather than those of more expensive character as would be necessary if a gradual and unbroken speed curve were required. Sudden short demands of the market also do not have any effect upon the operation of the line because the large volume of storage prevents constantly varying fluctuations in station operation.

If the compressors are actuated by prime movers regulated by governors controlling their motive power, the automatic speed regulation would be applied to the governors.

The pipe line and its associated apparatus, as illustrated and described, is representative of a simple form of a single line leading from a source of supply to a point of use. In actual practice, however, there may be many variations within the spirit of the invention. For example, the line may consist of sections having different pipe diameters due to large draw-offs en route to other markets or to supply towns, power plants and the like along the route. There may also be several sources of supply leading into the line at points along the length thereof and there may be several market legs to provide storage facilities as well as greater safety near the point of market. The system may also be maintained only in a line feeding into another trunk line. It is apparent that my system is adaptable to all of the above conditions and I, therefore, do not wish to be understood that the system is limited to a simple form of single long distance line as illustrated and described.

When a large portion of the flow is diverted into a market or markets en route, making it desirable not to carry full line pressure throughout the line but to carry a lower compressor discharge pressure over a portion of the line, this can be accomplished by setting contacts 237 of the stabilizers over a portion of the line at a higher point than on the balance of the line, still actuating all of the stabilizers from a common point, also by setting relief valves in the compressor bypasses to suit. The effect of this would be to maintain a greater differential in pressure drop over the part of the line carrying the combined volume of gas and a lower pressure drop in the portion carrying the reduced volume.

What I claim and desire to secure by Letters Patent is:

1. In a system for transporting gas to supply a varying flow demand including a pipe line extending from a source of gas supply to a point of delivery, and compressor stations located at spaced intervals along the line having intake and discharge connections with the line, means connected with the line for maintaining predetermined fixed discharge pressures at each of said stations, and means controlling said stations to vary the intake pressures of the stations within a predetermined range below said discharge pressures to compensate for varying flow demand.

2. In a system for transporting gas to supply a varying flow demand including a pipe line extending from a source of gas supply to a point of delivery, and compressor stations located at spaced intervals along the line and having intake and discharge connections with the line, a pressure control regulator at the delivery end of the line for maintaining a fixed back pressure at the inlet end of the line, means connected with the line for maintaining predetermined fixed discharge pressures at each of said stations, and means controlling said stations to vary intake pressures of the stations within a predetermined range below said discharge pressures to compensate for varying flow demand.

3. In a system for transporting gas to supply a varying flow demand, a pipe line extending from a source of supply to a point of delivery, compressor stations located at spaced points along the line, and a compressor at said stations having intake and discharge connections with the line, means connected with the line for creating a predetermined back pressure against discharge pressures at said compressor stations, means connected with the line adjacent said source for restricting gas from entering the line at a pressure higher than said predetermined back pressure, means for actuating the compressors for dropping inlet pressures at said stations below said predetermined back pressure, and means for regulating speeds of the compressors through the differential in pressures at the respective sides of the stations.

4. In a system for transporting gas to supply a varying flow demand including a pipe line extending from a source of gas supply to a point of delivery, and compressor stations located at spaced intervals along the line and having intake and discharge connections with the line, a pressure control regulator in the line for maintaining a fixed pressure at the delivery end of the line, means connected with the line for maintaining predetermined fixed discharge pressures at said stations, means controlling said stations to vary the intake pressures of the stations within a predetermined range below said discharge pressures to compensate for the varying flow demand, and means connected with the line ahead of the compressor station at the delivery end of the line for lowering the intake pressure at said station to effect increased flow velocity through the line.

5. In a system for transporting gas to supply a varying flow demand including a pipe line extending from a source of gas supply to a point of delivery, and compressor stations located at spaced intervals along the line having intake and discharge connections with the line, means connected with the line for maintaining predetermined fixed discharge pressures at said stations, means controlling said stations to vary the intake pressures of the stations within a predetermined range below said discharge pressures to compensate for varying flow demand, means located at each station for stabilizing said predetermined discharge pressures, and means common to all of said stabilizing means for setting said predetermined discharge pressures.

6. In a system for transporting gas to supply a varying flow demand including a pipe line extending from a source of gas supply to a point of delivery, compressor stations located at spaced intervals along the line, and compressors at said stations having intake and discharge connections with the line, means connected with the line for maintaining predetermined fixed discharge pressures at said stations, and speed control means governed by said discharge pressures for controlling operating speeds of said compressors to vary the intake pressures of the stations within a predetermined range below said discharge pressures to compensate for the varying flow demand.

7. In a system for transporting gas to supply a varying flow demand including a pipe line extending from a source of gas supply to a point of delivery, a pressure control regulator in the line for maintaining a fixed back pressure at the delivery end of the line, and compressor stations located at spaced intervals along the line having intake and discharge connections with the line, means connected with the line for maintaining predetermined fixed discharge pressures at said stations, and means connected with the line ahead of the compressor station at the delivery end of the line for lowering the intake pressure at said station to speed up movement of the flow through the line.

8. In a system for transporting gas to supply a varying flow demand, a pipe line extending from a source of gas supply to a point of delivery, compressor stations located at spaced points along the line, and a compressor at said stations having intake and discharge connections with the line, means connected with the line for maintaining predetermined discharge pressures at said compressor stations, actuators for operating the compressors to drop inlet presures at said stations below said discharge pressure, means controlling said actuators for maintaining a predetermined intake and discharge pressure ratio, and means in the line adjacent the market leg for depressing the intake pressure of the adjacent station whereby said depression is reflected back along the line to the intake of the other stations to cause said controlling means to effect speeding up of the compressors.

9. In a system for transporting gas to supply a varying market demand, a pipe line extending from a source of gas supply, a market leg connected with the line for storage and flow of gas to the market, compressor stations located at spaced points along the line, and a compressor at said stations having intake and discharge connections with the line, means connected with the line for maintaining predetermined discharge pressures at said compressor stations, actuators for operating the compressors to drop inlet pressures at said stations below said discharge pressure, means controlling said actuators for maintaining a predetermined intake and discharge pressure ratio, means in the line adjacent the market leg for depressing the intake pressure of the adjacent station whereby said depression is reflected back along the line to the intake of the other stations to cause said controlling means to effect speeding up of the compressors, and pressure actuated means connected with the market leg of the line and actuated by pressure therein for influencing said controlling means for speeding the compressor at said station when the market leg pressure drops below said predetermined discharge pressure to accelerate flow through the line.

10. In a system for transporting gas to supply a varying flow demand including a pipe line extending from a source of gas supply to a point of delivery, and compressor stations located at spaced intervals along the line having intake and discharge connections with the line, a pressure control regulator in the line for maintaining a fixed back pressure at the delivery end of the line, a speed control regulator at each station responsive to intake and discharge pressure differential of said stations for maintaining predetermined fixed discharge pressures at said stations, discharge pressure stabilizing means at each station, means for setting said pressure stabilizing means to maintain substantially the same predetermined discharge pressure at all the stations, and means connected with the line ahead of the compressor station at the delivery end of the line for lowering the intake pressure at said station to speed up movement of the flow through the line.

11. In a system for transporting gas to supply a varying demand, a pipe line extending from a source of gas supply to a point of delivery, compressor stations located at spaced points along the line, and compressors at said stations having intake and discharge connections therewith, means connected with the delivery end of the line for creating a predetermined back pressure against discharge pressures at said compressor stations, means for regulating speeds of the compressors through the differential in pressures in the line at the respective sides of said stations, and means connected with the line following said back pressure means for adjusting said speed regulating means at the station adjacent said back pressure means responsive to decline in pressure in said portion of the line following the back pressure means, whereby the compressor speed is controlled according to varying demand to influence operating speed of the compressors at the other of said stations.

12. In a gas transportation system including a pipe line extending from a source of gas supply to a point of delivery, compressor stations spaced along the line, and a compressor in each station having intake and discharge connections with the line, a regulator in the line for creating a predetermined back pressure against compressor discharge pressures, and means at each station for stabilizing the compressor discharge pressure including means for accelerating speed of the compressors when the discharge pressures drop below said predetermined back pressure.

13. In a gas transportation system including a pipe line extending from a source of gas supply to a point of delivery, compressor stations located at spaced points along the line, and a compressor in each station having intake and discharge connections with the line, a pressure control regulator at the delivery end of the line for creating a predetermined back pressure against compressor discharge pressures, means for stabilizing discharge pressures of the compressors, means for actuating the compressors for creating a pressure drop on the intake side of the stations below the predetermined back pressure to cause flow between the stations, means controlling compressor speeds parallel to the line flow demand, by-pass means for relieving excess gas pressure at the compressor discharge connections back across the compressors to the intake connections, pressure regulating means in said by-pass means, means for setting the pressure regulating means to a predetermined pressure substantially parallel to said predetermined discharge pressure, and means for raising said by-pass regulating means to a value higher than said predetermined pressure during the starting of flow through the line when the line is full of gas at substantially said predetermined back pressure.

14. In a system for transporting gas to supply a varying flow demand including a pipe line extending from a source of gas supply to a point of delivery, a pressure control regulator in the line for maintaining a fixed back pressure at the delivery end of the line, compressor stations located at spaced intervals along the line having intake and discharge connections with the line, pressure responsive means connected with the line controlling the operating speed of said stations for maintaining predetermined fixed discharge pressures at said stations, means connected with the line for bypassing gas from the intake of the compressor station adjacent the control regulator around said regulator for dropping the intake pressures of the stations below said predetermined pressure to effect increase of the operating speed of said stations.

15. In a system for transporting gas to supply a variable demand including a pipe line extending from a source of supply to a point of delivery, compressor stations spaced along the line, and a compressor at each station having intake and discharge connections with the line, means in the line for creating a predetermined back pressure against the discharge of the compressors, means for controlling speed of the compressors operating under influence of said predetermined back pressure, and means at the delivery end of the line for varying line flow delivery in response to variation of pressure across said back pressure means.

16. In a gas transportation line including compressor units having intake and discharge connections in the line to establish a pressure differential in the line, means for establishing a predetermined discharge pressure from said compressor units, means for retaining said pressure differential within a predetermined range including speed regulators operably connected with the compressor units for controlling speed thereof, means connected with the speed regulators and responsive to intake and discharge pressure differential for actuating said speed regulators, and means for changing the effective connection between said pressure responsive means and said regulators upon drop in the discharge pressure below said predetermined value.

17. In a system for transporting gas to supply a varying market demand, a pipe line extending from a source of gas supply to a point of delivery, compressor stations located at spaced points along the line, and a compressor at said stations having intake and discharge connections with the line, a pressure regulator connected with the delivery end of the line for maintaining predetermined back pressures at said compressor stations, a common pipe line control station at the delivery end of the line including compressor unit discharging against said regulator, and means associated with said control station other than the compressor in said station and connected with the line for lowering intake pressures of said compressor unit for effecting increased rate of flow through the line.

18. In a system for transporting gas to supply a varying demand, a pipe line extending from a source of supply to a point of delivery, compressor stations located at spaced points along the line, and a compressor at said stations having intake and discharge connections with the line, means connected with the line for maintaining a predetermined back pressure against discharge pressures at said compressor stations, and means for stabilizing said predetermined back pressure at all of said stations along the line to compensate for flow inequalities in the line.

19. In a gas transportation system, a pipe line extending from a source of supply to a point of delivery and compressor stations spaced along the line, and a compressor in each station having intake and discharge connections with the line, a pressure regulator for creating a predetermined back pressure at the discharge side of said stations, means at the inlet end of the line for restricting gas from entering the line at a pressure higher than said predetermined back pressure, means for actuating the compressors to effect flow through the line by drop of the inlet pressures of the stations below said predetermined back pressure, means for regulating speed of the compressors through the pressure differential across said stations, stabilizing means at each station co-operating with said speed regulating means, and means for adjusting selected stabilizing means for maintaining different predetermined back pressure at selected stations to compensate for withdrawal of gas along the line.

20. In a system for transporting gas to supply a variable demand, a pipe line extending from a source of supply to a point of delivery, compressor stations located at spaced intervals along the line, and a compressor in said stations having intake and discharge connections with the line, a master control station at the delivery end of the line, a back pressure regulator at said control station for creating a predetermined back pressure at each of said compressor stations, a differential pressure actuated speed controller for each of the compressor stations for controlling operating speed of the compressors, a pressure stabilizer at each station, and a stabilizer control mechanism at the control station for actuating said stabilizer.

21. In a system for transporting gas to supply a varying flow demand including a pipe line extending from a source of gas supply to a point of delivery, and compressor stations located at spaced intervals along the line having intake and discharge connections with the line, means connected with the line for maintaining predetermined fixed discharge pressures at said stations, means controlling said stations to vary the intake pressures of the stations within a predetermined range below said discharge pressures to compensate for varying flow demand, and means operable incidental to failure of a compressor station to increase operating speed of the next succeeding station to drop its intake pressure below said predetermined range.

22. In a system for transporting gas to supply a variable market demand, a pipe line extending from a source of supply to a point of delivery, compressor stations located at spaced points along the line, and a compressor in each station having intake and discharge connections with the line, means for actuating the compressors for causing flow through the line, a speed control regulator for each compressor, and means interconnecting the speed control regulators to automatically regulate speed of a succeeding station in case the compressor at a preceding station should fail to function.

23. In a system for transporting gas to supply a variable market demand, a pipe line extending from a source of supply to a point of delivery, compressor stations located at spaced points along the line, and a compressor in each station having intake and discharge connections with the line, double rated motors for actuating the compressors for causing flow through the line, electric circuits for the motors, a speed control regulator for each compressor having pairs of resistance elements, and means connecting the speed control regulator of one station to that of the next station to automatically cut in one resistance element and cut out the other for operating the motor of a succeeding station on high rating in case the compressor at a preceding station should fail to function.

24. In a system for transporting gas, a pipe line extending from a source of gas supply to a point of delivery, compressor stations located at spaced points along the line, and a plurality of compressors at said stations having intake and discharge connections with the line, means for simultaneously starting one of the compressors at each station, means at each station for establishing predetermined discharge pressures, and automatic means individual to each station for successively starting the other of said compressors to help the first compressor in maintaining said predetermined pressures.

25. In a gas transportation system including a pipe line, and compressor units located at spaced points along the line and having intake and discharge connections with the line at the said points, a speed control regulator for controlling speed of each compressor unit, means responsive to pressure differential between the intake and discharge pressures in the line for actuating said speed control regulators, a second compressor unit located at each of said points and having intake and discharge connections with the line, and means connected with the speed regulators for automatically rendering said second units effective when the intake and discharge differential reaches a predetermined value.

26. In a gas transportation system including a pipe line, compressor stations located at spaced points along the pipe line, and a compressor in each station having intake and discharge connections with the line, means for maintaining predetermined pressure differential across the compressor stations, a speed controller for the compressors, means for operating said controller through said pressure differential, means for bleeding the line across said compressor stations, and means for raising relief point of said bleeding means on starting the compressors when the pipe line is full of gas.

27. In a gas transportation system including a pipe line divided into station legs and a market leg, compressor stations located between said station legs, and a compressor in each station having intake and discharge connections with adjacent legs, a back pressure regulator between the last station leg and the market leg, a master control station between the last station leg and the back pressure regulator, means for maintaining a predetermined discharge pressure at the compressor stations, stepped means controlling speed of the compressors to maintain the discharge pressures, means at the control station for depressing intake pressure of the control station for effecting speed of the compressors at the compressor stations while maintaining said predetermined back pressure, and relief by-passes connected with the line around said compressors to co-operate with storage capacity in the market leg whereby variation in gas flow caused by stepped compressor regulation is minimized.

28. In a pipe line system for transporting gas, a plurality of sets of compressors located at spaced points along the line, a motor for actuating each compressor, and a circuit for supplying current to the motors, starter switches in said circuit for initially starting one of the motors in each set, a circuit for actuating the starter switches, speed controllers in said circuit operable independently of said starter switches when there is pressure differential across the sets of compressors, and means for rendering the starter switch circuit ineffective when a predetermined pressure differential is established.

29. In a gas transportation system including a pipe line, gas compressing means spaced along the line, automatic means for regulating speed of the compressing means operating in response to pressure differentials across said compressing means, and means acting in synchronism with the regulating means for compensating said regulating means for variation in density of the gas.

30. In a gas transportation system, compressors located along the line and having intake and discharge connections therewith, actuators for the compressors, and means operably connecting the actuators with their respective compressors, a clutch and a brake in said connecting means, and means actuated by the line pressure differential across the compressors for releasing the clutch and applying the brake to prevent back spin of the compressors.

31. In a system for transporting gas including a pipe line extending from a source of gas supply to a point of delivery, and compressor stations located at spaced intervals along the line having intake and discharge connections with the line, check valves located at intervals along the line between the compressor stations, and means associated with said check valves for shutting down selected compressor stations upon actuation of one of the check valves.

32. In a pipe line system for transporting gas to supply a variable market demand, and a plurality of centrifugal compressors having intake and discharge connections with the line, means for maintaining a predetermined fixed pressure in the discharge connection, by-passes interconnecting the intake and discharge connections, and relief means in the by-pass whereby recirculation of a portion of the gas is effected through said centrifugal compressors to compensate for difference in volume of gas flowing through the system and the volume required by the compressors in establishing required pressure lift against said predetermined pressure.

ALFRED J. DIESCHER.